United States Patent

Girvin et al.

[11] Patent Number: 6,164,424
[45] Date of Patent: Dec. 26, 2000

[54] SHOCK ABSORBER WITH BYPASS DAMPING

[75] Inventors: Robert H. Girvin, Holliston, Mass.; Edward C. Jones, Jr., Apple Valley, Calif.

[73] Assignee: K2 Bike Inc., Woonsocket, R.I.

[21] Appl. No.: 08/891,528

[22] Filed: Jul. 11, 1997

Related U.S. Application Data

[63] Continuation-in-part of application No. 08/857,125, May 15, 1997, Pat. No. 5,996,745.

[51] Int. Cl.[7] .......................................................... F16F 9/32
[52] U.S. Cl. .......................................... 188/266.7; 188/316
[58] Field of Search .............................. 188/266.7, 282.5, 188/316, 317, 319.1, 322.15

[56] References Cited

U.S. PATENT DOCUMENTS

| | | |
|---|---|---|
| 3,059,915 | 10/1962 | Kemelhor . |
| 3,240,295 | 3/1966 | Martinek et al. . |
| 3,376,031 | 4/1968 | Lee . |
| 3,614,615 | 10/1971 | Cass . |
| 3,874,635 | 4/1975 | Fletcher et al. . |
| 3,894,437 | 7/1975 | Hagy et al. . |
| 4,045,738 | 8/1977 | Buzzell . |
| 4,132,395 | 1/1979 | Fox, Jr. . |
| 4,565,940 | 1/1986 | Hubbard, Jr. . |
| 4,626,730 | 12/1986 | Hubbard, Jr. . |
| 4,729,459 | 3/1988 | Inagaki et al. ........................ 188/299.1 |
| 4,894,577 | 1/1990 | Okamoto et al. . |
| 4,940,236 | 7/1990 | Allen . |
| 4,961,483 | 10/1990 | Yamaoka et al. . |
| 5,013,955 | 5/1991 | Hara et al. .............................. 310/316 |
| 5,054,785 | 10/1991 | Gobush et al. . |
| 5,097,171 | 3/1992 | Matsunaga et al. . |
| 5,154,263 | 10/1992 | Lizell .................................... 188/299.1 |
| 5,201,388 | 4/1993 | Malm . |
| 5,267,589 | 12/1993 | Watanabe . |
| 5,278,496 | 1/1994 | Dickmeyer et al. . |
| 5,332,068 | 7/1994 | Richardson et al. . |
| 5,381,089 | 1/1995 | Dickmeyer et al. . |
| 5,405,159 | 4/1995 | Klein et al. . |
| 5,445,401 | 8/1995 | Bradbury . |
| 5,449,189 | 9/1995 | Chen . |
| 5,450,009 | 9/1995 | Murkami . |
| 5,454,452 | 10/1995 | Öhlin . |
| 5,509,677 | 4/1996 | Bradbury . |
| 5,590,908 | 1/1997 | Carr . |
| 5,593,007 | 1/1997 | Siltanen . |

FOREIGN PATENT DOCUMENTS

| | | |
|---|---|---|
| 4109180A1 | 9/1991 | Germany . |
| 61-013041 | 1/1986 | Japan . |

OTHER PUBLICATIONS

Edelbrock Performer IAS Shocks, "Inertia Active System", www.edelbrock.com, Sep. 23, 1999.

*Primary Examiner*—Matthew C. Graham
*Assistant Examiner*—Pamela J. Lipka
*Attorney, Agent, or Firm*—Christensen O'Connor Johnson Kindness PLLC

[57] ABSTRACT

A shock absorber for a vehicle includes a fluid-filled cylinder having a closed end, a shaft extending partially into the cylinder, a valve attached to the first end of the shaft, and a power supply. The valve includes a valve piston and a bender. The valve piston includes at least one orifice extending therethrough. The bender is seated adjacent the orifice in the piston. The bender includes a piezoelectric material embedded therein. The piezoelectric material includes sides with conductive material disposed thereon. The power supply is attached to the conductive material across the piezoelectric material in the bender to apply a voltage across the piezoelectric material to change the stiffness of the bender. A sensor is also included for monitoring the displacement and velocity of the piston within the fluid-filled cylinder. The biasing force on the bender is changed on sensor readings according to predetermined logic sequence. In another embodiment, a dampener is provided that allows fluid bypass outside of the main fluid reservoir through a channel that leads to a valve. The valve is preferably controlled by a piezoelectric bender outside the reservoir. In various embodiments, the valve includes a balanced cylinder with secondary fluid flow controlled by the piezo bender to activate a moving diaphragm for valve movement.

25 Claims, 17 Drawing Sheets

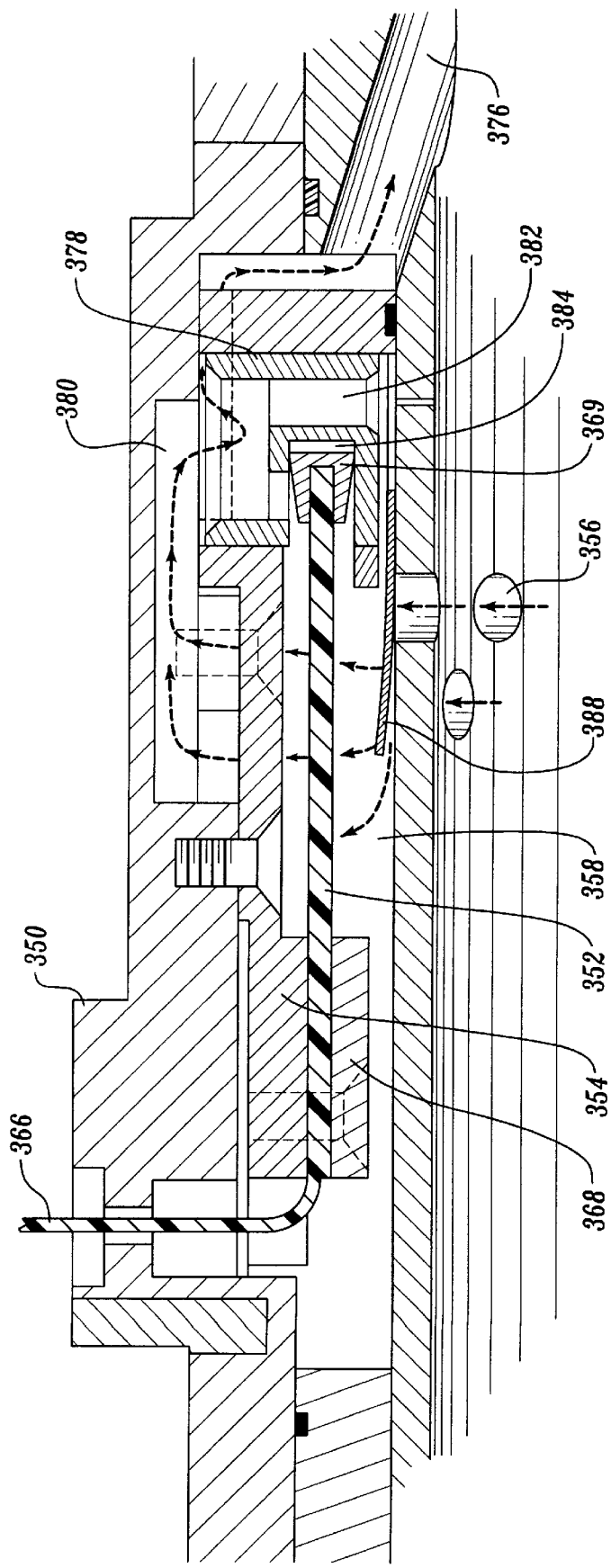

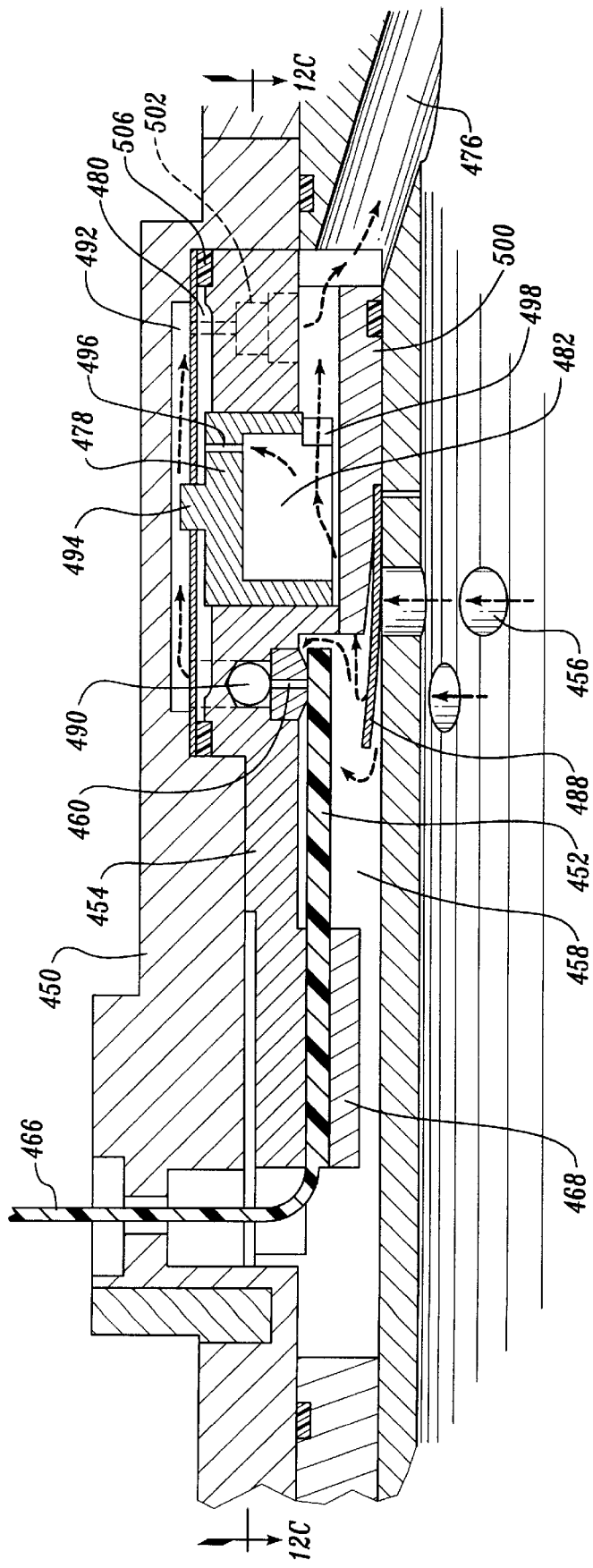

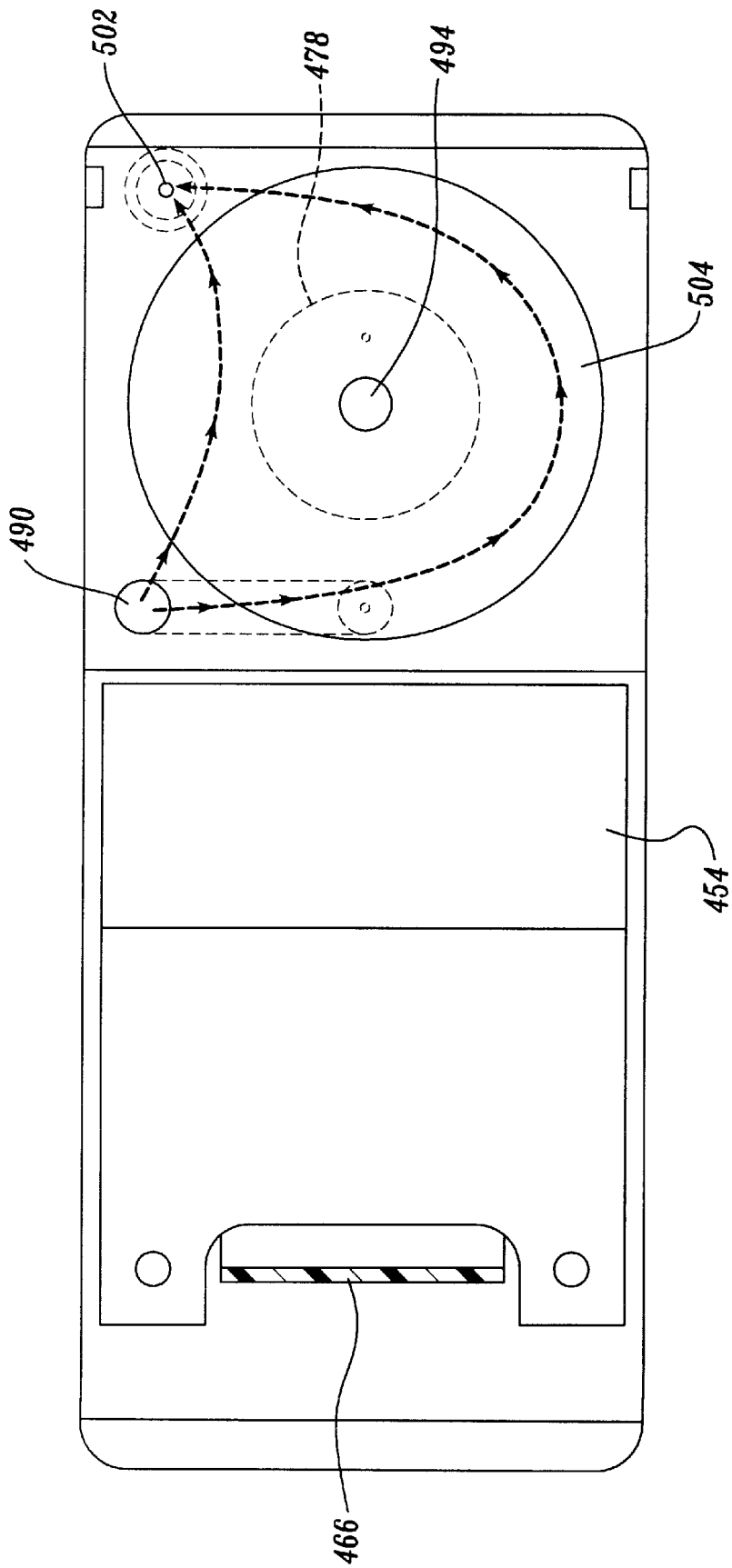

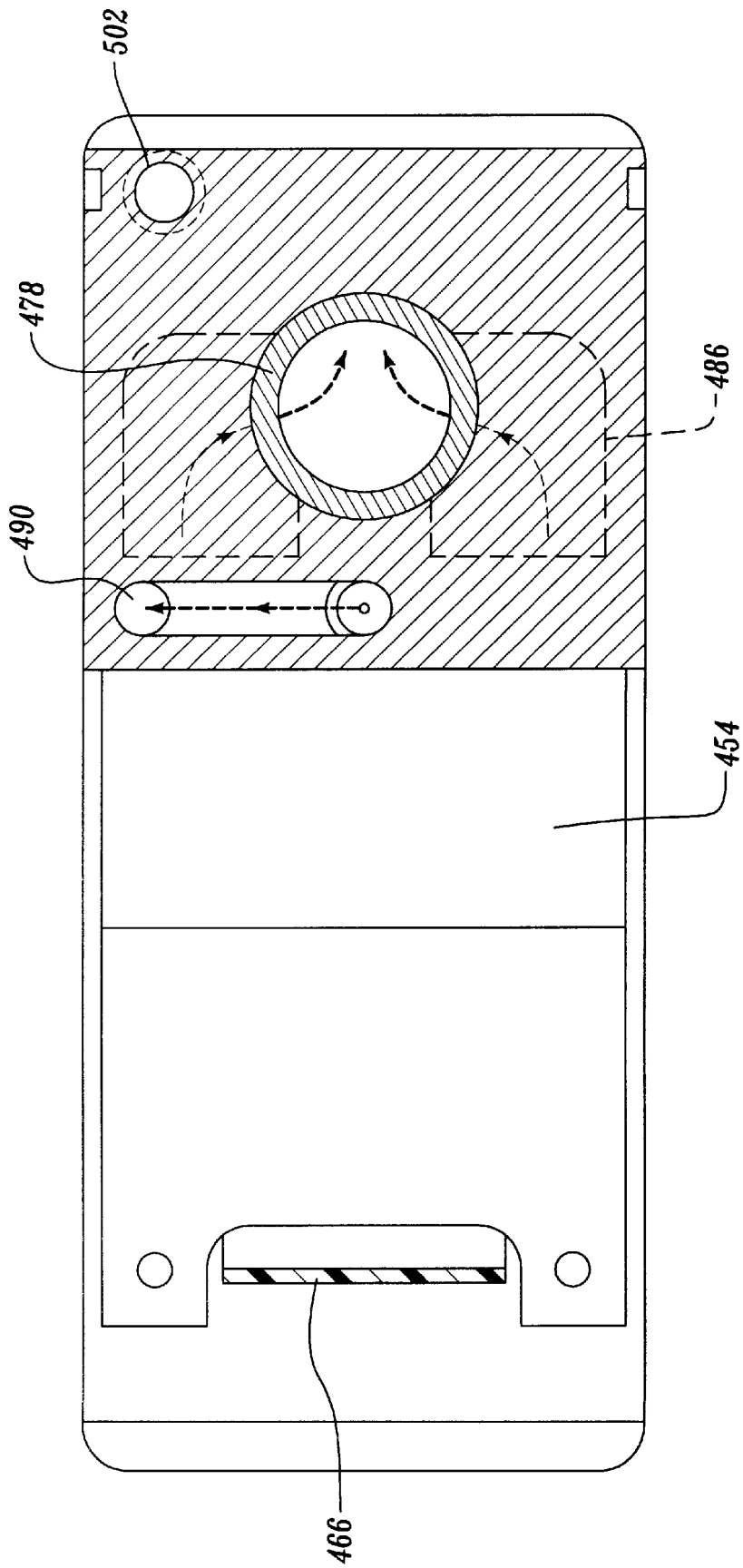

SHOCK ABSORBER WITH BYPASS DAMPING

RELATED APPLICATIONS

This is a continuation-in-part of utility application Ser. No. 08/857,125 filed May 15, 1997, now U.S. Pat. No. 5,996,745.

FIELD OF THE INVENTION

The present invention relates to shock absorbers for vehicles, such as bicycles and motorcycles, and more particularly, to a dampener valve for a shock absorber to regulate the flow of damping fluid based on feedback regarding velocity and displacement of the shock absorber shaft relative to the shock absorber body.

BACKGROUND OF THE INVENTION

Front and rear suspensions have improved the performance and comfort of mountain bicycles. Over rough terrain the suspension system can improve traction and handling by keeping the wheels on the ground. A rider can more easily maintain control at higher speeds and with less effort when the suspension absorbs some of the shock encountered when riding. Ideally the suspension should react well to both (1) low amplitude, high frequency bumps and (2) high amplitude, low frequency bumps. However, these can be competing requirements for the damping systems in conventional shock absorbers.

Higher rebound damping is desirable for high amplitude, low frequency bumps than for low amplitude, high frequency bumps. With high frequency, low amplitude bumps, such as may be encountered on a washboard gravel fireroad, minimal damping may be preferable so the spring can quickly recover from a minor impact before the next is encountered. However, with a large bump (such as the size of a curb) increased rebound damping aids the rider by keeping the bike from forcefully springing back too quickly, causing loss of traction and control on the rebound. Compression damping will also stop the bike from bottoming out with large bumps and make for a smoother absorption of the bumps.

Some current shock absorbers that include springs and dampeners allow the rider to adjust rebound and/or compression damping before a ride. Other air shock absorbers include an on/off switch to disable the shock absorber all together. However, such preadjustment is at best a compromise; the rider must select better damping in one scenario at the expense of the other. A typical off-road mountain bike ride will include small bumps, medium, and large bumps, as well as possibly jumps, drop-offs, and tight descending to ascending transitions. If the rider significantly reduces the damping to ride smoothly over high frequency, low amplitude bumps then the bike may lose traction and control when a large bump is encountered or may "bottom out" the shock absorber. If the rider increases the damping force of the shock absorber, then the system will not recover fast enough to quickly absorb high frequency bumps, the rider will be rattled, and the bike will lose traction.

Another limitation of current shock absorbers is evidenced by rider-induced bobbing: suspension movement caused by rider movement during pedaling. Related to this is pedal-induced suspension action: the cyclic forces on the chain pulling the rear swingarm up or down relative to the frame. If the damping in the shock absorber is greater, these influences will not be felt as much by the rider. However, a stiff suspension, especially at the beginning of the stroke of the shock absorber, can decrease the ability of the suspension to absorb small bumps well.

Attempts to overcome the current limitations in suspension systems have focused on swingarm linkages and pivot arrangements. At a significant cost, some amelioration of rider- or pedal-induced suspension action has resulted, but much less progress has been made on the dilemma of large and small bump absorption.

SUMMARY OF THE INVENTION

The present invention addresses the suspension challenges of both high frequency/low amplitude and low frequency/high amplitude shock absorption while also reducing rider- and pedal-induced suspension action. The present invention can be applied to most suspension configurations as it addresses these challenges with a unique, active damping shock absorber. The shock absorber is soft over small bumps and stiffens when encountering large shocks after the shock travels to a certain extent. The shock absorber stiffens further under extreme shock to avoid harsh bottoming out. Rebound damping may also be tuned independent of compression damping. The shock absorber changes damping during compression and rebound according to the speed and displacement of the shaft assembly relative to the housing during the suspension action.

The present invention includes a dampener for a shock absorber. The dampener preferably includes a fluid reservoir, a piston, a channel, and a valve. The fluid reservoir contains fluid for damping action of the shock absorber. The piston is disposed at least partially within the reservoir. The piston is forced at least partially through the reservoir under the force of a shock acting on the shock absorber. The channel is in fluid communication with the reservoir. Fluid flows through the channel during at least a portion of the stroke of the piston through the reservoir. The valve at least partially obstructs the channel. The valve includes a mechanism and control for changing the flow through the channel based on at least one of the velocity and position of the piston relative to the reservoir.

In the preferred embodiment, the valve includes a bender. The bender moves to affect the flow of fluid through the channel. The bender preferably includes a response material embedded within at least a portion thereof.

In one preferred aspect of the invention, the valve includes a flow restriction member and a diaphragm attached thereto. The bender is moveable to direct a secondary flow of fluid to a side of the diaphragm to move the diaphragm. The diaphragm moves the restriction member. A primary flow of fluid passes through the channel as controlled by the flow restriction member.

In the preferred embodiment of the invention, the response material includes a piezoelectric material. The valve further includes a power supply connected to the piezoelectric material for biasing the bender to affect the flow through the channel. In one aspect of this embodiment, a sensor is provided to detect shock compression conditions. The sensor changes the biasing force of the bender for flow change when the sensor signals predetermined conditions.

In one aspect of the invention, the flow restriction member is moveable generally transverse to the direction of fluid flow through a portion of the channel adjacent the restriction member. Preferably, the flow restriction member is connected to the bender with movement of the bender controlling the flow restriction member.

In one aspect of the invention, the reservoir is contained by a housing. The channel extends through inflow and outflow openings or channels within the housing. Preferably, the inflow opening is located within the housing in a location to be at least partially blocked by the piston upon extensive movement or stroke of the piston within the reservoir or housing. Preferably, the outflow opening is located within the housing in a location to be at least partially blocked by the piston during the initial portion of the stroke of the piston. Thus, during extensive stroke of the piston within the reservoir the inflow opening or channel is at least partially blocked to increase the damping force. During the initial portion of the stroke of the piston, the outflow opening or channel is either at least partially blocked or opens to the first end of the piston whereas with further stroke of the piston within the reservoir, the outflow opening or channel transmits fluid to the second end of the piston during compression of the piston within the reservoir.

BRIEF DESCRIPTION OF THE DRAWINGS

The foregoing aspects and many attendant advantages of this invention will become more readily appreciated as the same becomes better understood by reference to the following detailed description, when taken in conjunction with the accompanying drawings, wherein:

FIG. 11A is a partial cross-sectional view of a first alternate bypass valve arrangement for the shock absorber;

FIG. 12A is a partial cross-sectional view of a second alternate bypass valve arrangement for the shock absorber;

FIG. 12B is a top view of a portion of the valve arrangement of FIG. 12A; and

FIG. 12C is a top cross-sectional view of a lower portion of the valve arrangement of FIGS. 12A and 12B.

DETAILED DESCRIPTION OF THE PREFERRED EMBODIMENTS

The shock absorber damping system of the present invention may be employed in a multitude of different applications. However, the system disclosed and described herein is particularly well suited to vehicles, especially bicycles of the mountain bike variety. The system is also well suited to motorcycle suspension systems, especially off-road motorcycles. Mountain bicycles will be referred to throughout this detailed description. However, it should be understood that mountain bikes are simply the preferred application and the same concepts and basic constructions can be used in other shock absorber applications.

The damping system of the present shock absorber is particularly advantageous with mountain bikes since large, medium, and small bumps, drops, and shock-producing surfaces are encountered during mountain bike riding. Typically, low amplitude bumps occur at a high frequency. For example, a washboard gravel road may have numerous, close together small bumps that create high frequency, low amplitude shocks at the wheels of the bicycle. Conversely, high amplitude bumps have a relatively lower frequency, since the size of the bump itself dictates that the bumps be somewhat spaced apart. A street curb is an example of a high amplitude, low frequency bump. Numerous rocks, bumps, roots, and other obstacles are encountered when mountain biking off-road. The shock absorber of the present invention is designed to handle all these bumps. Further, the shock absorber may also be programmed to reduce other undesirable cycling effects such as pogo action or bobbing, as well as chain-induced suspension action.

Figure 1:
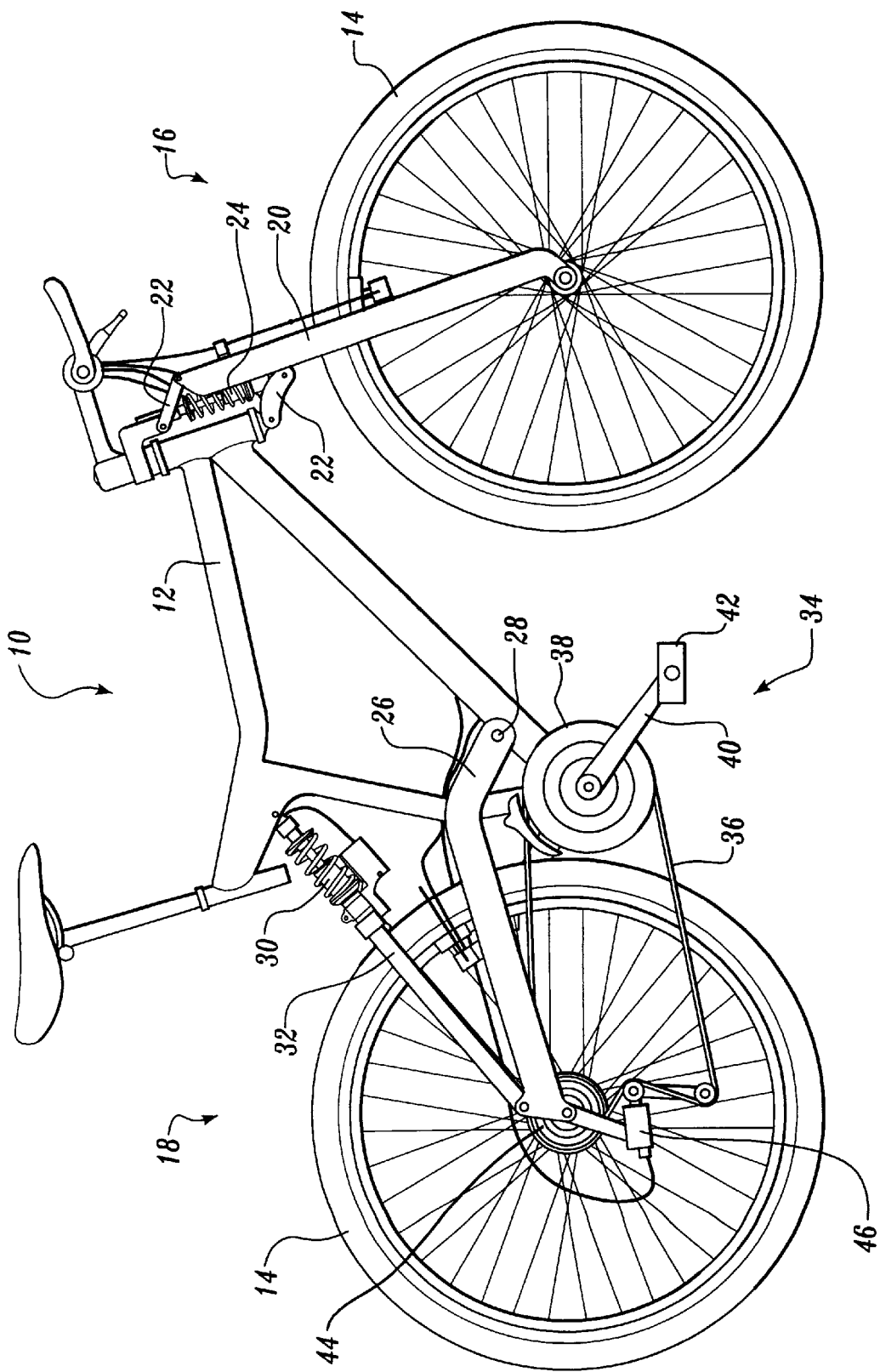
FIG. 1 is a side elevational view of the shock absorber of the present invention secured in the rear suspension of a bicycle.

FIG. 1 illustrates a mountain bike with the shock absorber of the present invention. Bicycle 10 indicates a frame 12, wheels 14, a front suspension 16, and a rear suspension 18.

Front suspension 16 is attached to the head tube portion of frame 12 and includes forks 20 that extend downwardly from linkages 22 connecting forks 20 to the frame head tube. A front shock absorber 24 is disposed between linkages 22 to provide front suspension action. Both shock absorption and damping are provided by front shock absorber 24, as is described in detail below. Front suspension 16 may have many alternative configurations, such as telescoping forks, other linkage mechanisms, or shock absorbing stems. The same damping concepts discussed herein can be applied to these other arrangements.

Rear suspension 18 includes a rear swing arm 26 pivotally attached to frame 12 about a pivot 28. A rear shock absorber 30 is also attached at one end to frame 12. Shock stays 32 extend upwardly from the rearward end of swing arm 26 to the lower end of rear shock absorber 30. Thus, when swing arm 26 pivots upwardly about pivot 28, shock absorber 30 is compressed such that the rear wheel 14 is allowed to move relative to frame 12 to absorb and dampen shock. Again, alternative rear suspension systems can be employed with rear shock absorber 30. Other systems may include unified rear triangles, unified swing arm and chain stay arrangements, and other linkage assemblies. Leverage ratios on the shock absorber may change, for example, while still using the same core damping technology. The concepts herein can also be applied to pull shock absorbers. In all of these systems, damping of the suspension action is advantageous.

Bicycle 10 also includes a drive system 34. Drive system 34 is preferably constructed as is known in the art. Drive system 34 includes a chain 36 that extends around chain rings 38 that are attached to frame 12 via the bottom bracket. Cranks 40 are also secured to chain rings 38 with pedals 42 at the outer ends. Rear sprockets 44 are secured to the rear wheel 14 with a rear derailleur 46 for shifting the chain from one sprocket to another. Drive system 34 is relevant to shock absorption, particularly in the arrangement illustrated in FIG. 1, since the upper drive line of chain 36 extends beneath pivot 28 such that as force is applied to pedals 42, chain 36 slightly pulls suspension 18 downwardly. This can be advantageous as it helps to increase traction of rear wheel 14 on the riding surface. However, if the rider does not have smooth pedaling action, then cyclic forces on chain 36 may cause cyclic bobbing of rear suspension 18 as the bicycle is ridden. As will be explained in more detail below, the damping system of rear shock absorber 30 can help eliminate such chain-induced suspension action.

Figure 2A:
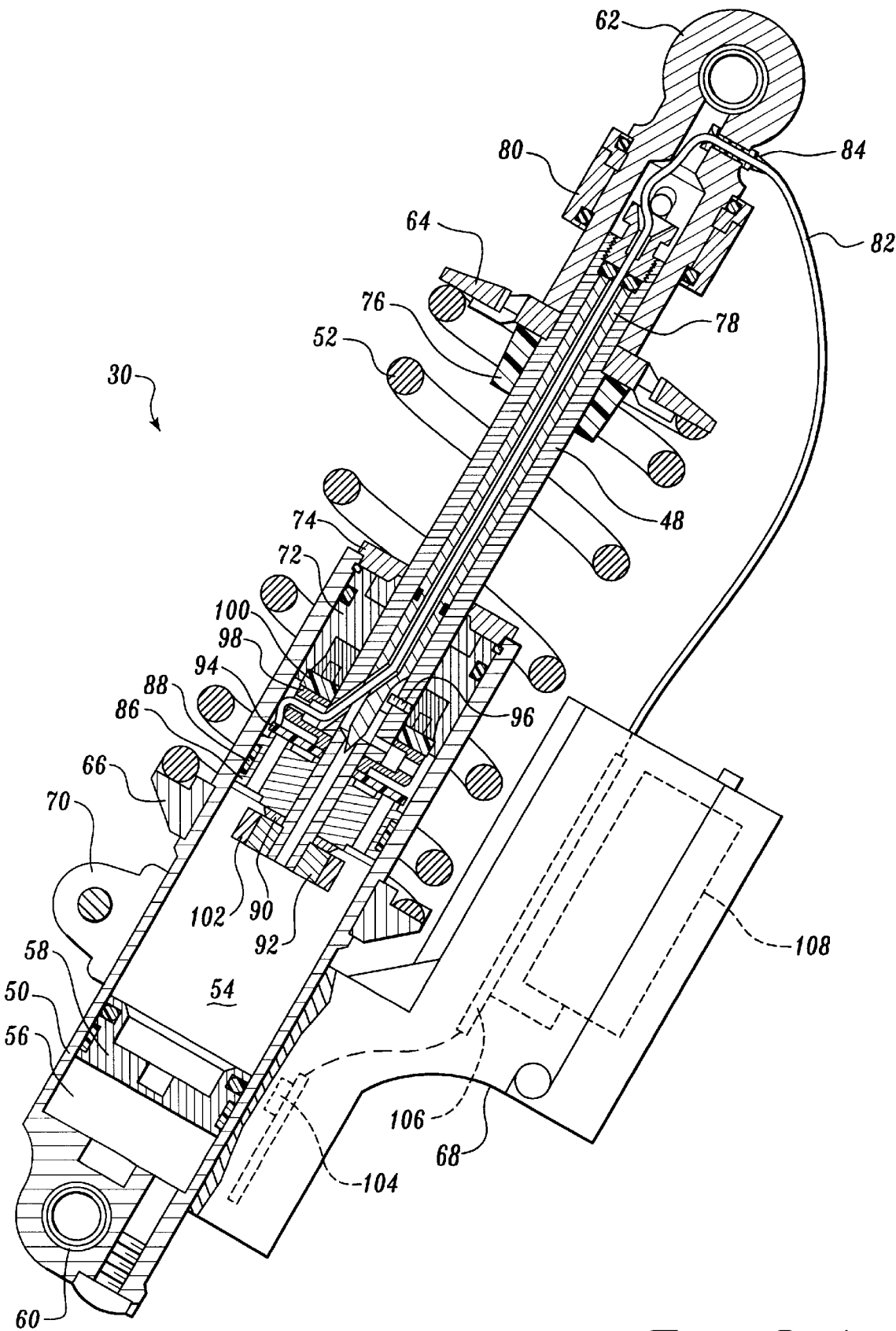
FIG. 2A is a cross-sectional view of the shock absorber illustrated in FIG. 1.
Figure 2B:
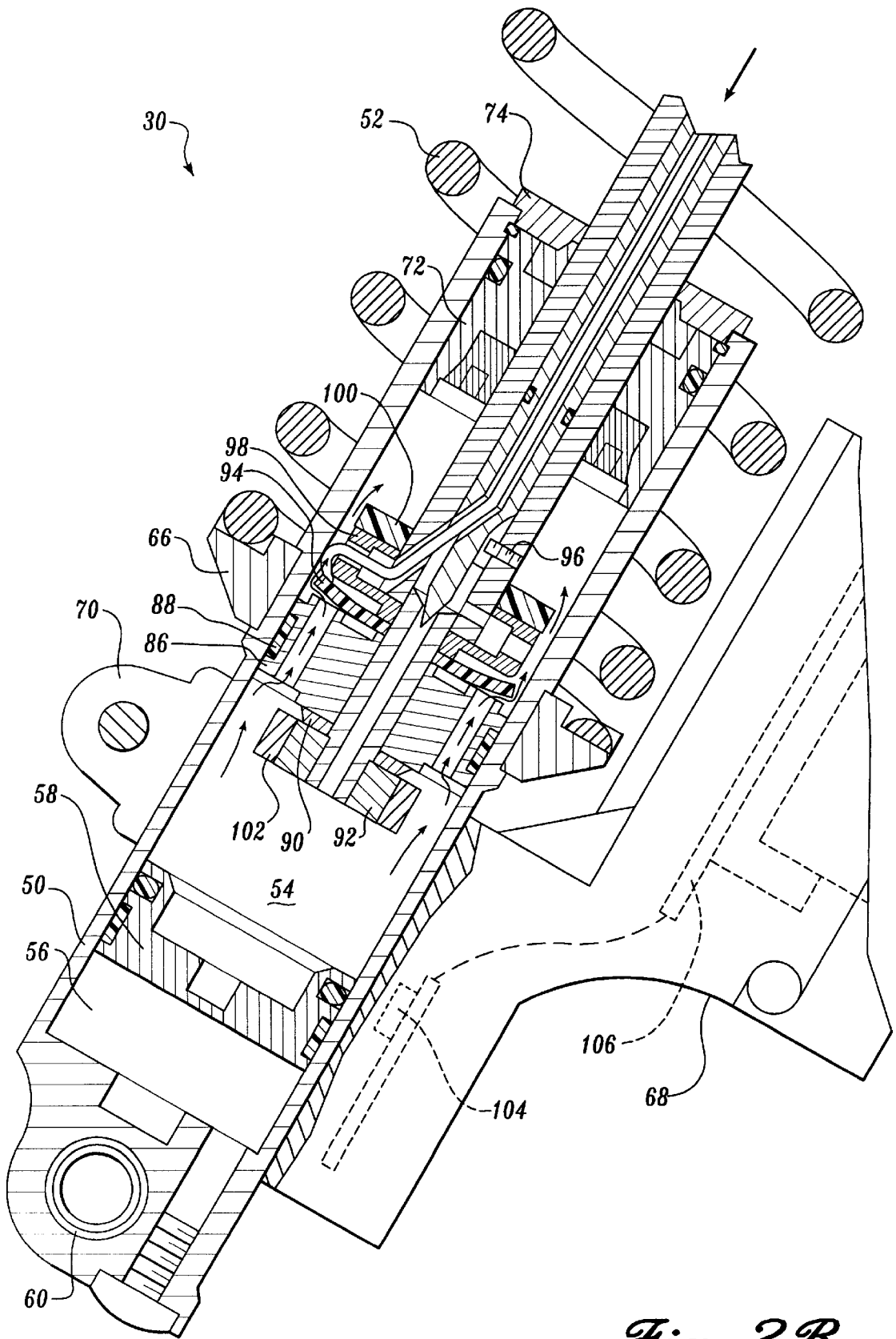
FIG. 2B is a partial cross-sectional view of the shock absorber illustrated in FIG. 2A during a compression stroke.
Figure 2C:
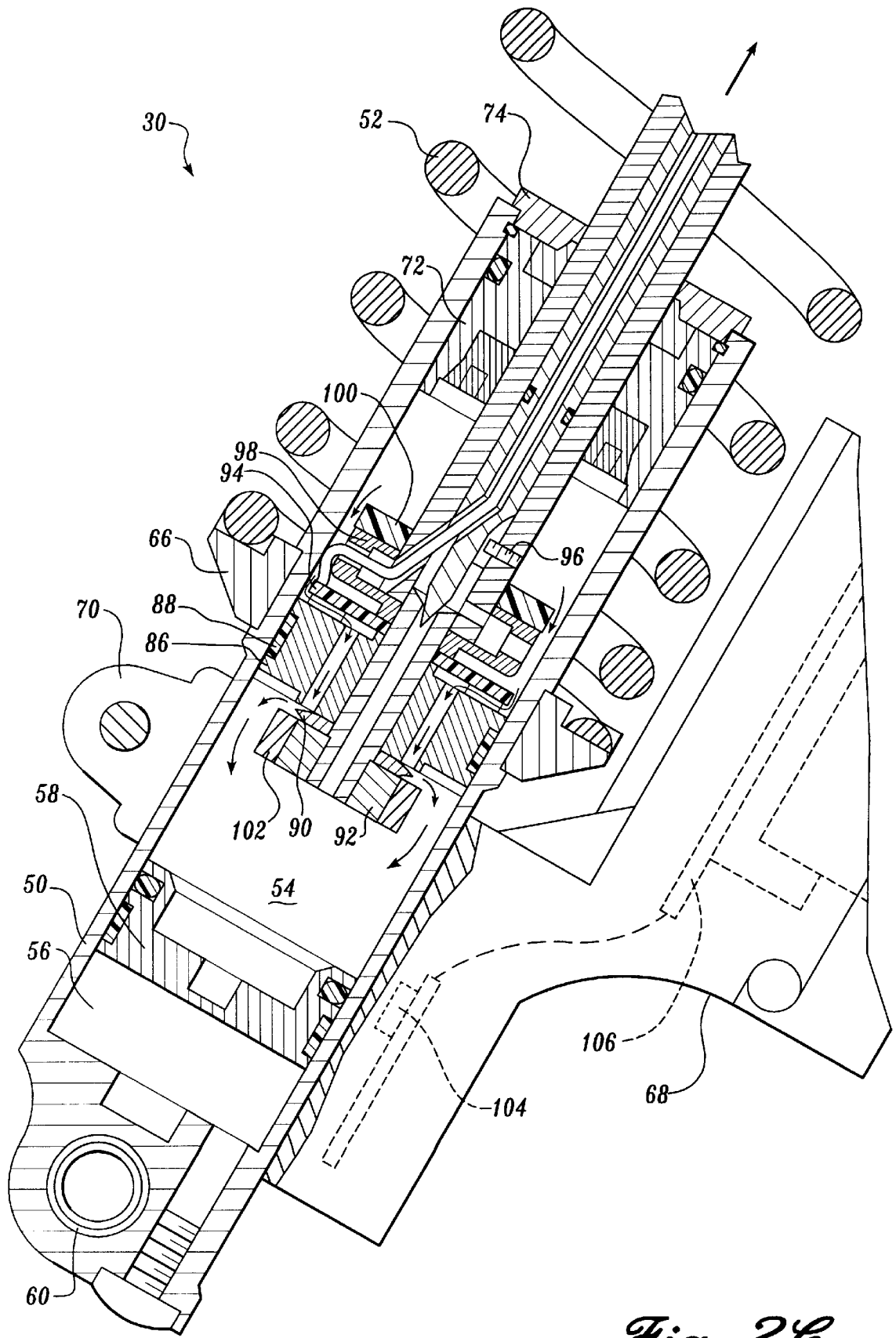
FIG. 2C is a partial cross-sectional view of the shock absorber during a rebound stroke.

Referring now to FIGS. 2A–C, the details of the inner construction of shock absorber 30 will now be discussed. Note that while shocker absorber 30 refers to the shock absorber used with the rear suspension of the bicycle illustrated in FIG. 1, the same or similar shock absorber can be employed on the front suspension. Externally, shock absorber 30 appears much like standard shock absorbers currently on the market. Many details of the shock absorber are much like those manufactured by Noleen Racing of Adelanto, Calif. Shock absorber 30 includes a shaft 48 extending into a reservoir housing 50. A spring 52 extends along shaft 48 and over a portion of reservoir housing 50. Spring 52 absorbs shock and provides rebound while shaft 48, extending into reservoir housing 50, provides damping as explained below.

Reservoir housing 50 encloses hydraulic reservoir 54 and gas chamber 56. Hydraulic reservoir 54 is separated from gas chamber 56 by a chamber seal 58. In the preferred embodiment of the invention, both gas chamber 56 and hydraulic reservoir 54 are contained within the same cylindrical reservoir housing 50. Chamber seal 58 includes an O-ring to separate gas chamber 56 from hydraulic reservoir 54 and to allow chamber seal 58 to move within reservoir housing 50 as needed. Gas chamber 56 preferably holds nitrogen gas such that additional damping is provided when the gas is compressed due to a large shock. Alternatively, a gas chamber may be mounted outside reservoir housing 50 in its own chamber with an interconnecting channel as is well known in the art.

The outer end of reservoir housing 50 opposite shaft 48 includes a housing end mount 60 for mounting the end of rear shock absorber 30 either to a bicycle frame or to other suspension components. A shaft end mount 62 is provided on the opposite side of shock absorber 30 at the end of shaft 48. Note in FIG. 1 that shaft end mount 62 is mounted to frame 12 while housing end mount 60 is secured to shock stays 32.

Spring 52 is held on shaft 48 and reservoir housing 50 with spring stop 64 secured to shaft 48 at the end of shaft end mount 62 and preload wheel 66 at the opposite end of spring 52. Preload wheel 66 is threadably engaged on reservoir housing 50. Thus, by turning preload wheel 66, the preload in spring 52 can be adjusted.

An electronics housing 68 is also provided on shock absorber 30. Housing 68 holds the power supply and circuitry, as well as the sensor necessary to control the damping action of shock absorber 30. Housing 68 is secured to reservoir housing 50 with housing clamp 70 extending around the outside thereof between preload wheel 66 and housing end mount 60.

Hydraulic reservoir 54, when manufactured, includes an opening at only one end through which shaft 48 is inserted. A reservoir seal 72 (including the seal head, the scraper seal, and the O-ring) extends around shaft 48 and is held tightly within the open end of reservoir housing 50 in order to create an enclosed reservoir 54. A reservoir cap 74 is also included on the outside of reservoir seal 72. Reservoir cap 74 and reservoir seal 72 ensure that no hydraulic fluid escapes from hydraulic reservoir 54. O-rings are employed at critical locations to ensure adequate sealing. Should shaft 48 extend all the way into reservoir 54, reservoir cap 74 will abut a bottom out bumper 76 held on shaft 48 adjacent spring stop 54.

As with standard Noleen Racing shock absorbers, an adjustment needle 78 is housed within shaft 48, shaft 48 being hollow. Adjustment needle 48 regulates the bypass flow of hydraulic fluid within hydraulic reservoir past the piston 86. An adjustment wheel 80 is provided to move adjustment needle 78 longitudinally within shaft 48 in a conventional manner. An element not included in conventional shock absorbers, wire 82, extends from housing 68 through a wire seal 84 in shaft end mount 62. Wire 82 then extends through a hollowed central core of adjustment needle 78 to near the tip thereof. This wire electrically links the electronics within housing 68 to the dampener valve for control thereof. Since wire 82 extends out the side of adjustment needle 78, rotation of adjustment needle 78 must be kept in check. Therefore, pin 96 extends through the side of shaft 48 into a recess in the side of adjustment needle 78 such that wire 82 may be properly channeled to the side of bender 94. As will be explained below, wire 82 actually includes multiple wires within a tough, flexible housing.

Figure 3A:
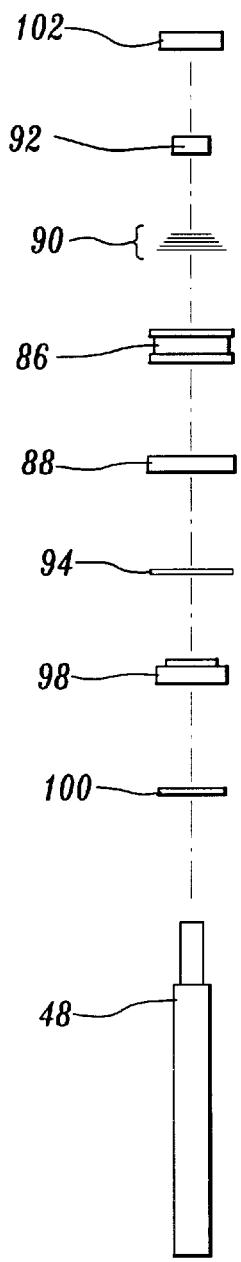
FIG. 3A is an exploded view of the dampener valve assembly.
Figure 3B:
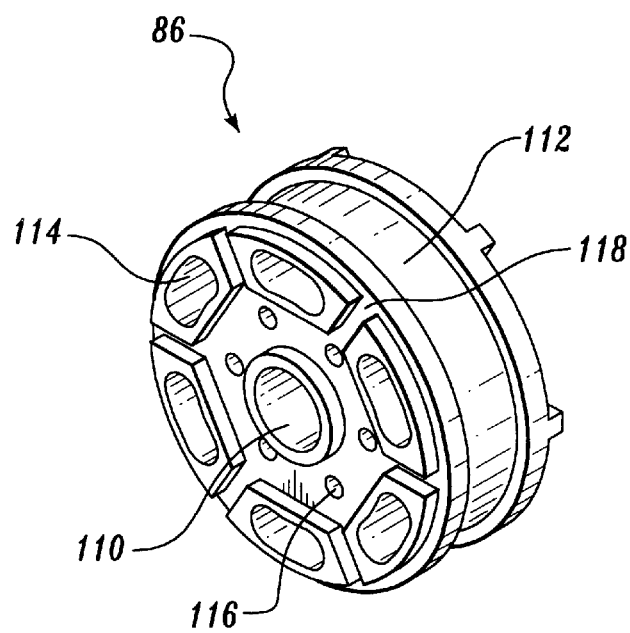
FIG. 3B is an isometric view of the piston body.

The piston assembly of shock absorber 30 is seen in its assembled configuration in FIGS. 2A–C and in an exploded view in FIG. 3A. FIG. 3B illustrates an enlarged view of a piston 86. As seen in FIGS. 2A–C and FIG. 3A, a band 88 constructed of a Teflon material is secured around piston 86. In the preferred embodiment of the invention, shim washers 90 are stacked against the innermost end of piston 86 (shim washers 90 are shown all together in FIGS. 2A–C such that they appear to be a single truncated cone). Shim washers 90 function in a conventional manner to regulate the flow of fluid through piston 86, especially during rebound as shaft 48 moves away from reservoir housing 50. A nut 92 is threadably engaged on the innermost end of shaft 48 to hold shim washers 90 securely against piston 86. Nut 92 thus holds the entire piston assembly on the end of shaft 48.

A bender 94 is secured on the opposite side of piston 86 from shim washers 90. Bender 94 will be discussed in more detail below in connection with FIGS. 4A and 4B. Bender 94 includes piezoelectric material that is connected to wire 82 in order to apply a voltage across bender 94. Bender 94 is preferably arranged on the shaft side of piston 86 in order to control the compression damping of the piston assembly when it travels through reservoir 54.

As seen in FIGS. 2A–C and 3A, bleed spacer 98 is held on the shaft side of bender 94 and is seated on the shoulder of shaft 48 to hold the piston assembly between the shoulder of shaft 48 and nut 92. Bleed spacer 98 allows the bypass of fluid flow past adjustment needle 78, allows a conduit through which wire 82 extends to the side of bender 94, and rests on the shoulder of shaft 48 for holding the piston assembly in place. A flexible top out bumper 100 is force-fit onto shaft 48 below bleed spacer 98. Top out bumper 100 is useful when shaft 48 is pushed all the way out to the end of tis stroke by spring 52 such that bumper 100 contacts reservoir seal 72.

In the preferred embodiment of the invention, a sensor assembly is provided to detect both the displacement of shaft 48 and the piston assembly relative to the reservoir housing 50 as well as the velocity of shaft 48 and the piston assembly. In the preferred embodiment of the invention a giant magnetorestrictive sensor (GMR) is employed. Other sensors may alternatively be used to detect either the displacement or velocity of shaft 48 relative to housing 50. For example, proximity sensors, variable reluctance sensors, or other magnetic or mechanical sensors may be used. GMR sensors are also referred to as magnetoresistive sensors. (Description of such sensors can be found in prior art, such as in U.S. Pat. No. 5,450,009 to Murakami, and in multiple journal articles. Examples of articles discussing such sensors include "Magnetic Field of Dreams," by John Carey, *Business Week,* Apr. 18, 1994; "The Attractions of Giant Magnetoresistance Sensors" by Ted Tingey, *Electrotechnology,* Vol. 7, part 5, pgs. 33–35, October–November 1996; and in "High Sensitivity Magnetic Field Sensor Using GMR Materials With Integrated Electronics," by Jay L. Brown, Proc. *IEEE* International Symposium on Circuits and Systems Vol. 3, pgs. 1864–1867, 1995.) The sensor and control arrangement preferably employed in the present invention includes a magnet 102 secured about nut 92 on the end of the piston assembly. A sensor 104 is secured within housing 68 adjacent reservoir housing 50 near the closed end thereof. Sensor 104 can alternatively be mounted at the end of housing 50. Sensor 104 is connected to circuit board 106. Circuit board 106 (or alternatively a microprocessor chip that includes the microprocessor logic to control bender 94 based on the detection signal from sensor 104. Circuit board 106 is then in turn connected to wire 82 for connection to bender 94. The operation of circuit board 106 will be explained in more detail in connection with FIG. 6. A battery 108 is also held within electronics housing 68 in order to provide power to sensor 104 and to bender 94. Preferably, a conventional 9-volt battery is used within electronics housing 68 to provide the power required for the bender and the sensor.

Referring now to FIG. 3B, further details of the functioning of the piston and valve assembly will be described. Piston 86 is the type sometimes used with shim washers 90. Piston 86 includes a shaft bore 110 that slides over the end of shaft 48 to be held thereon. Shaft bore 110 is disposed in the center thereof and is circular in cross-section. A circumferential recess surrounds the outer curved side of piston 86. Circumferential recess 112 is sized to secure Teflon band 88 therein. The face of piston 86 that is turned toward shaft 48 is illustrated in FIG. 3B. The large openings in piston 86 are the compression flow channels 114. These channels extend entirely through piston 86 and actually begin within recesses on the opposite side of piston 86 from that shown in FIG. 3B. Thus, during compression (when shaft 48 is being pressed into reservoir 54, see FIG. 2B) fluid easily enters channels 114 since the recesses allow the flow to go beneath shim washers 90 into channels 114. However, bender 94 is secured adjacent the shaft side of piston 86 so as to obstruct the flow of fluid through channels 114 at their exit ends.

By controlling the stiffness or bias of bender 94, the flow through compression flow channels 114 (see FIG. 2B) can be effectively controlled to increase or decrease the damping.

Rebound flow channels 116 also extend through piston 86. Note that these channels are held within rebound flow recess 118 so that bender 94 does not significantly obstruct the flow of fluid back through rebound flow channels 116 (see FIG. 2C). However, note that the size of these channels is somewhat smaller than that of compression flow channels 114 such that rebound damping is generally greater than compression damping. The flow through rebound flow channels 116 extend from the face shown in FIG. 3B to the opposite face as the piston assembly moves in the direction of shaft 48. Flow in this direction is obstructed by shim washers 90 which are deflected by the flow through rebound flow channels 116 and by some flow through compression flow channels 114. Rebound flow recess 118 not only extends around the entrance of rebound flow channels 116, but includes arms that extend between compression flow channels 114 such that flow may move around bender 94 for rebound action.

In an alternate embodiment of the invention, shim washers 90 may also be replaced by a bender such as bender 94 to more completely control rebound damping, as well as compression damping with the piston assembly.

In another alternate embodiment of the present invention, the flow channel or channels are disposed in the side of a modified reservoir housing. In this embodiment, the bender is positioned to regulate the flow of fluid from one side of the piston to the other through the channel in the housing as the piston is forced through the reservoir. Control of the bender then affects the level of damping.

Figure 4A:
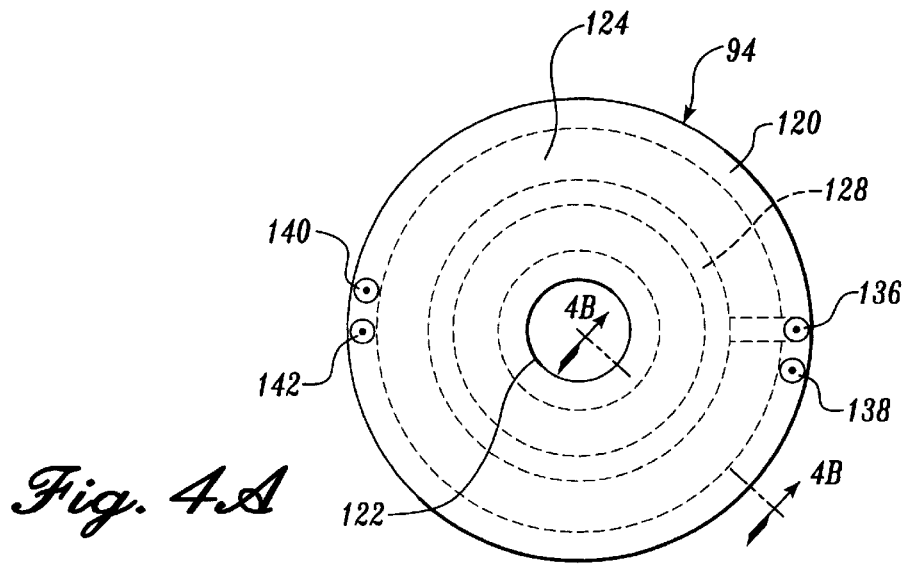
FIGS. 4A and 4B are a plan view and partial cross-sectional view, respectively, of the piezoelectric disk that is seated against the valve body.
Figure 4B:
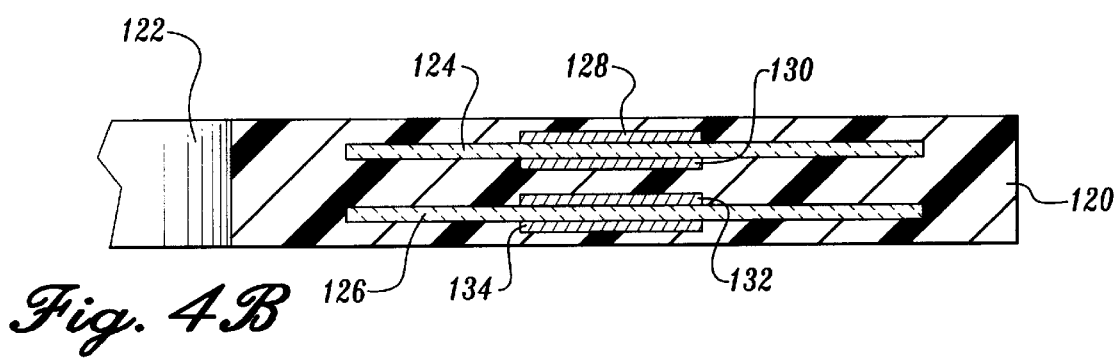

Referring now to FIGS. 4A and 4B, the construction of bender 94 will be described. Bender 94 includes a disk 120 preferably constructed of a polyimide material. A Polyimide polymer is preferably used due to its toughness and electric insulating characteristics. Disk 120 includes a center aperture 122 which slides over the end of shaft 48 between piston 86 and bleed spacer 98. Note that the top of bleed spacer 98 includes a small cylindrical projection to space the outer portion of disk 120 from the remainder of bleed spacer 98 to allow bender 94 to flex downwardly toward bleed spacer 98.

Within disk 120 a piezoelectric top layer 124 and piezoelectric bottom layer 126 are held. Top layer 124 and bottom layer 126 are spaced from one another. Alternative embodiments of the invention include only a single piezoelectric layer or more than two piezoelectric layers. Piezoelectric layers 124 and 126 are also disk-shaped in parallel planes to one another and parallel to the plane of disk 120. First and second electrodes 128 and 130 contact the upper and lower faces of top layer 124. Electrodes 128 and 130 are connected to circuit board 106 such that a voltage can be applied across piezoelectric top layer 124. As seen in FIG. 4, first and second connectors 136 and 138 are provided for connection to wires held within wire 82. Third and fourth electrodes 132 and 134 are likewise secured above and below piezoelectric bottom layer 126 such that a voltage can be applied thereacross. Note that third electrode 132 is adjacent second electrode 130, but does not come in contact therewith. Thus, voltages may be independently applied across top layer 124 and bottom layer 126. Referring to FIGS. 4A and 4B, third and fourth connectors 140 and 142 are coupled to third and fourth electrodes 132 and 134.

When a voltage is applied across piezoelectric top layer 124, the material bends in one direction depending on the polarity of the applied voltage. The piezoelectric layer will always be biased to flex such that the concave side of the layer is the positive polarity, whereas the convex side is the negative polarity. Therefore, if a voltage is applied across top layer 124 in the same direction as across bottom layer 126, then both piezoelectric layers will bend or at least be biased in the same direction and bias bender 94 in the same direction. Since bender 94 bears against compression flow channels 114 of piston 86, then if first electrode 128 and third electrode 132 have the negative polarity as the voltage is applied across top and bottom layers 124 and 126, the damping will be increased since bender 94 will tend to be biased strongly toward piston 86. Thus, increased damping results since the fluid flow through compression flow channels 114 is more highly restricted by bender 94 essentially having a higher spring rate under the applied voltage. Alternatively, if first and third electrodes 128 and 132 have the positive polarity and second and fourth electrodes 130 and 134 have a negative polarity, then bender 94 is biased slightly away from compression flow channels 114 to decrease the compression damping as piston 86 is forced through reservoir 54. With no voltage applied across layers 124 and 126, the normal stiffness of disk 120 then affects the flow with a medium level of damping.

Alternatively, differing levels of damping may be accomplished by changing the voltage applied across top layer 124 and bottom layer 126 rather than simply changing the polarity of the voltage applied. In the preferred embodiment of the invention, amplifiers increase the voltage from the 9-volt battery to 200 volts to be applied across the layers of piezoelectric material.

Figure 5:
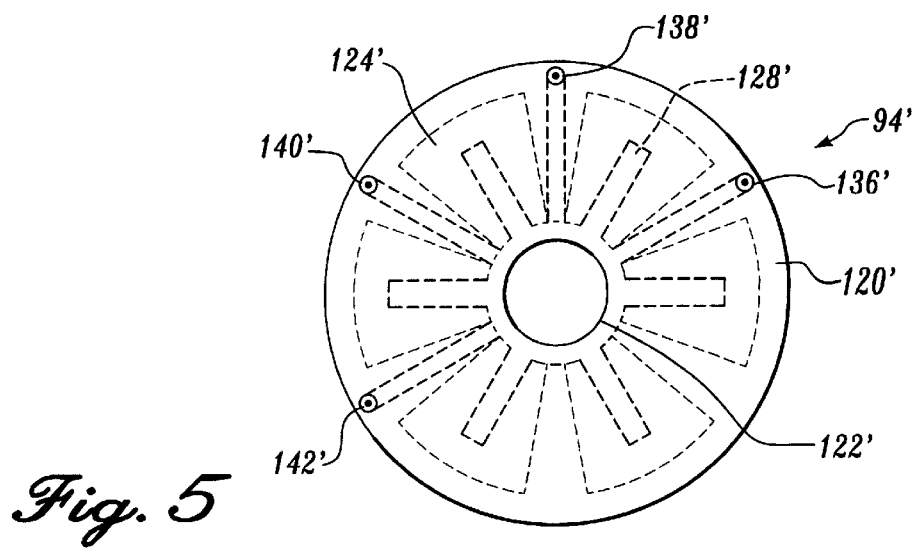
FIG. 5 is a plan view of an alternative embodiment of the valve disc illustrated in FIGS. 4A and 4B.

In still other alternative embodiments, a different "bender" may be used. For example, an alternative bender 94' is illustrated in FIG. 5. The bender 94' utilized alternately shaped electrodes 128', but functions similarly to bender 94. All corresponding components of bender 94' are numbered the same as for bender 94, but are noted with a prime. As a further example, instead of utilizing a piezoelectric material to move the bender valve, other primary movers could change the biasing force of a bender covering a fluid channel. For example, an electromagnet could be employed to change the force of a bender against a flow orifice.

Likewise, if shim washers 90 are replaced with a bender valve such as has been described with regard to bender 94, rebound damping can be controlled by applying voltage to piezoelectric material within a disk.

Figure 6:
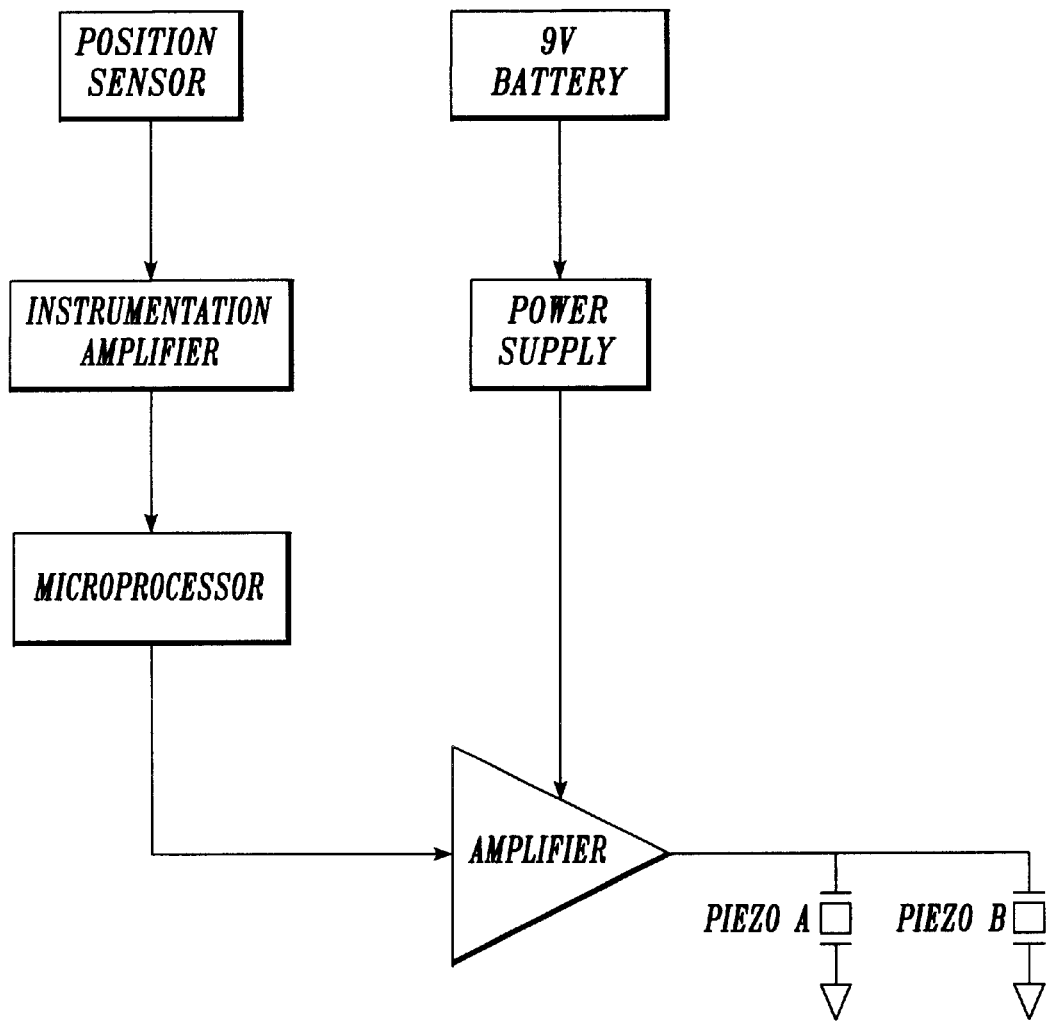
FIG. 6 is a schematic diagram of the logic circuit used to control the piezoelectric disk illustrated in FIGS. 4A and 4B.

FIG. 6 illustrates in a schematic diagram the basic logic to drive the two piezoelectric layers 124 and 126 within bender 94. As the shock moves, the position and velocity sensor 104 sends signals through an instrumentation amplifier to the microprocessor. The logic in the microprocessor, at predefined conditions, sends signals to the amplifier such that the power is provided through the amplifier across the piezoelectric top and bottom layers in a desirable fashion to either increase or decrease the damping level by changing the bending bias of bender 94. The amplifier changes the voltage applied across the piezoelectric material from 9 volts to preferably 200 volts. While in FIG. 6 piezos A and B are shown connected together, it should be noted that this is simply a schematic diagram and piezos A and B may be independently switched on and off of applied voltages across them in one direction or another. The specific electronics for such a circuit which would selectively apply voltages to piezoelectric top and bottom layers 124 and 126 may be readily accomplished by those skilled in the electronics arts. Alternatively, instead of a 9-volt battery, other battery or power supplies may be employed. For example, if the present system were employed on a motorcycle, the power supply could come from the motorcycle power supply (e.g., battery or magneto).

Figure 7A:
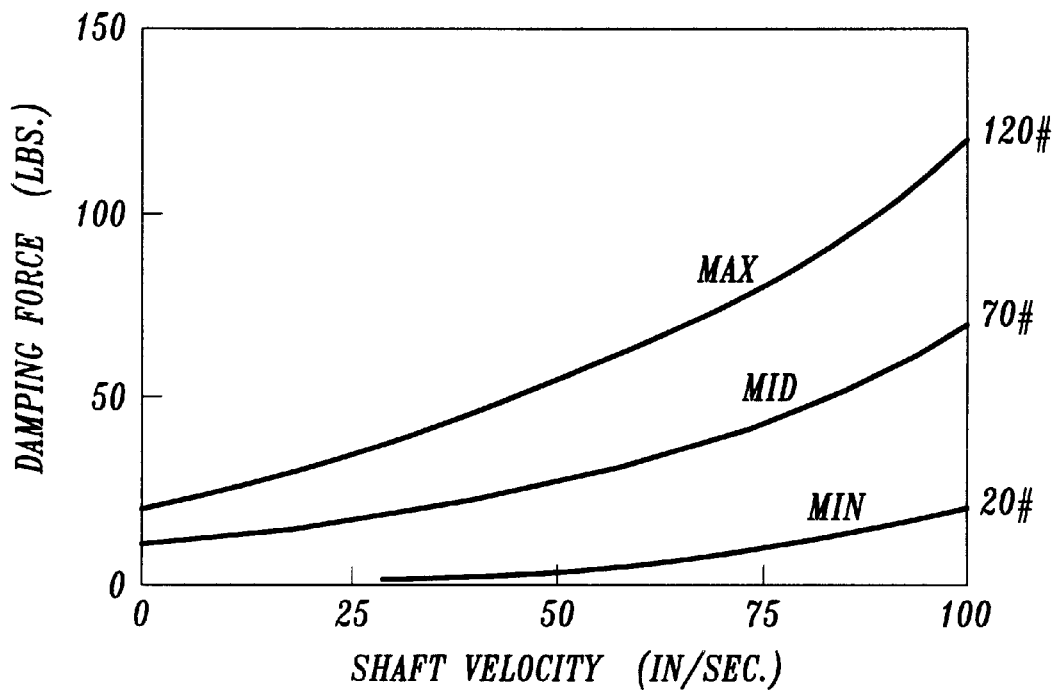
FIG. 7A graphically illustrates damping force versus shaft velocity for three levels of damping.

The damping force versus shaft velocity of the shock absorber for each of the three basic scenarios of bender 94 is illustrated in FIG. 7A. The line representing the "MID" damping force is the condition in which no voltage is applied across top and bottom layers 124 and 126 of the piezoelectric material. In this condition, bender 94 acts much like a metal shim that is deflected away from the flow through piston 86 as piston 86 is forced through hydraulic reservoir 54. With an increase in shaft velocity, the damping force naturally increases. However, if a voltage is applied across piezoelectric top and bottom layers 124 and 126 such that the negative polarity is applied to the first and third electrodes 128 and 132, a condition of maximum damping is achieved such that the damping follows the "MAX" curve shown in FIG. 7A. However, if the polarity is reversed such that bender 94 is biased away from piston 86, the damping force follows the "MIN" curve illustrated in FIG. 7A. Thus, without changing the amount of applied voltage, but just by changing the polarity of the voltage or whether the voltage is applied at all, three discreet levels of damping can be achieved. In each of these levels the damping increases with shaft velocity.

The "MID" level of damping is constructed so that the bender reacts the same as a current dampener piston assembly with shims being used instead of bender 94 such that if no power is applied to the piezoelectric layers, then the shock absorbers still provide good shock performance. This would be the case, for example, if the battery were dead or in case of some other electrical breakdown.

Figure 7B:
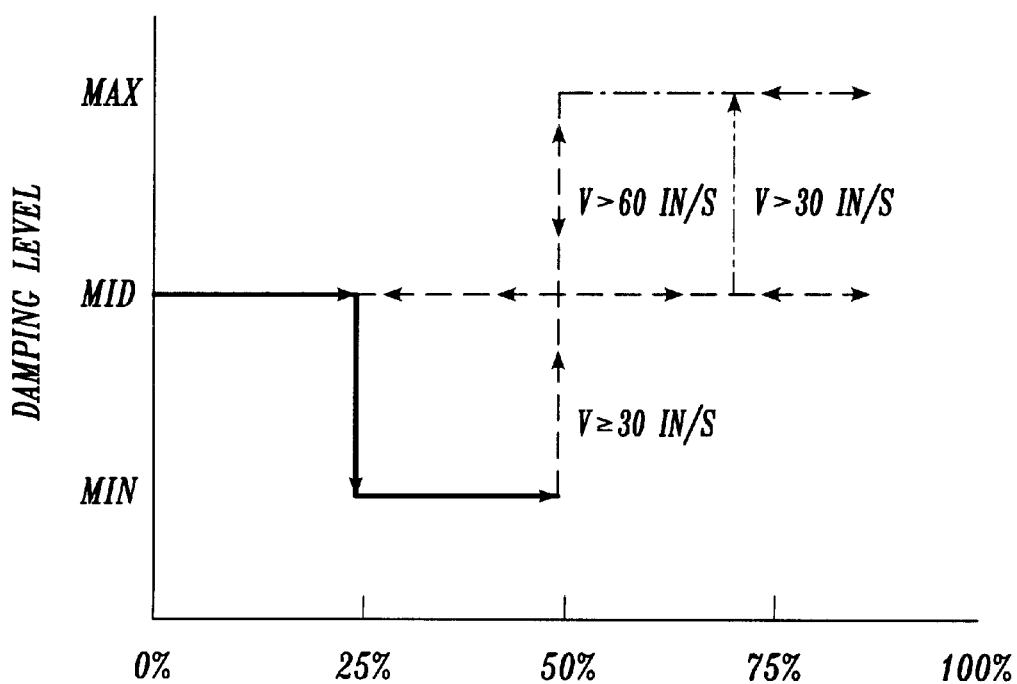
FIG. 7B graphically illustrates damping force during damping piston travel within the shock absorber of the present invention.

Referring now to FIG. 7B, a preferred programming of the dampener will be described. With a rider's weight on bicycle 10, shock absorber 30 will move to about 20% of travel. At this point, the compression damping will be at the nominal level (MID curve of FIG. 7A) to provide resistance to pogo action of the suspension system due to rider bobbing or chain-induced suspension action. Alternatively, maximum damping may be applied a this point to further reduce pogo action. However, preferably the MID level of damping is provided until approximately 25% of the travel.

As soon as the shaft moves beyond the 25% point, the system switches to minimum damping by applying the proper voltage with the proper polarity across piezoelectric layers 124 and 126. Thus, when the rider encounters low amplitude, high frequency shock, the damping is at a minimum level to be able to respond quickly to the shock and absorb it without the shock being transferred to the rider through the bike frame 12.

If the shaft goes past 50% of travel, its velocity is computed by the sensor and chip. If the velocity is greater than about 30 inches per second the system switches to the MID level of damping. This would be the case when a larger bump is encountered. If the velocity of the shaft is greater than 60 inches per second, the damping would switch directly to the MAX damping level to deal with extremely large bumps. At 70% of travel, the shaft velocity will be recomputed and, if greater than 30 inches per second and not already in the stiff MAX level, then it would be switched to that level. Thus, the system will avoid the suspension completely bottoming out by providing increased compression damping to handle the large shocks.

When the shaft returns to a position less than 50% of travel, the system switches to the MID stiffness level, if it is not already there. The above is just one possible scenario that may be programmed into the logic circuit in the circuit board or chip such that the suspension damping actively and instantaneously responds to shocks encountered. The figures above for velocity and displacement are simply one set that could be used. Depending on how the shock is arranged with a given suspension system and the desired attributes of the shock, these numbers can be changed and the chip or circuit board can be programmed accordingly.

Thus, the level of damping is automatically and instantaneously changed during riding so that low amplitude, high frequency bumps are easily absorbed with minimal damping while large high amplitude low frequency bumps are absorbed with higher damping so as to not bottom out the suspension and to avoid the shock from springing back too quickly. Both velocity and displacement of the shaft relative to the reservoir housing 50 are important to proper damping. If the travel passes 50%, but the velocity is very slow, then increased damping is not required. However, if the travel passes 50% with a very high velocity, then increased damping can be effective in improved shock absorber performance. Nevertheless, alternative embodiments may also be employed where velocity by itself or displacement by itself are measured and the damping level is adjusted based on a single input. Further, other sensor input may also be employed to control damping levels.

Referring now to FIGS. 8–12, a preferred embodiment of a bypass valve arrangement of the present invention will now be described along with two alternate embodiments of the bypass valve arrangement. The bypass valve utilizes many of the same concepts and features discussed above, especially in the preferred embodiment. Thus, the above discussion of the operation of the electronic circuitry to increase or decrease the damping forces during certain portions of the stroke of the piston or travel of the suspension substantially applies to the embodiments discussed below. Furthermore, the advantages discussed above also apply to these embodiments. The last two digits of the numbering is the same as above for similar or identical elements designated below.

The bypass valve preferred embodiment of the invention will now be discussed with FIGS. 8–10. The bypass valve functions with a shock absorber arrangement very similar to that discussed above in that the shock absorber includes a shaft 148 having a spring 152 thereabout, the shaft connected to a piston 186 that is slidably disposed within a hydraulic reservoir 154. Hydraulic reservoir 154 is formed with a reservoir housing 150. In this particular embodiment of this invention, reservoir housing 150 includes a housing flange 249 to secure the bypass valve arrangement.

Piston 186 may include piezo disks at the end thereof to control the flow through piston 186 as described above. However, in the preferred embodiment of the shock absorber 130 with the bypass valve arrangement, conventional rebound shim washers 190 and compression shim washers 191 are employed against the forward and trailing sides of piston 186. Piston 186 includes a magnet 202 secured about nut 192 to provide a preferred method of sensing the position and displacement of piston 186 relative to housing 150 in combination with a sensor 104 secured near the housing end mount 160 of shock absorber 130 as described above. Shim washers 190 and 191 are preferably a stack of thin metallic washers that can be arranged and adjusted to preset characteristics for compression and rebound damping. With the bypass valve arrangement, shim washers 190 and 191 may be arranged and constructed such that higher damping through piston 186 is achieved due to the extra damping allowed through the bypass valve assembly as described below.

Figure 8:
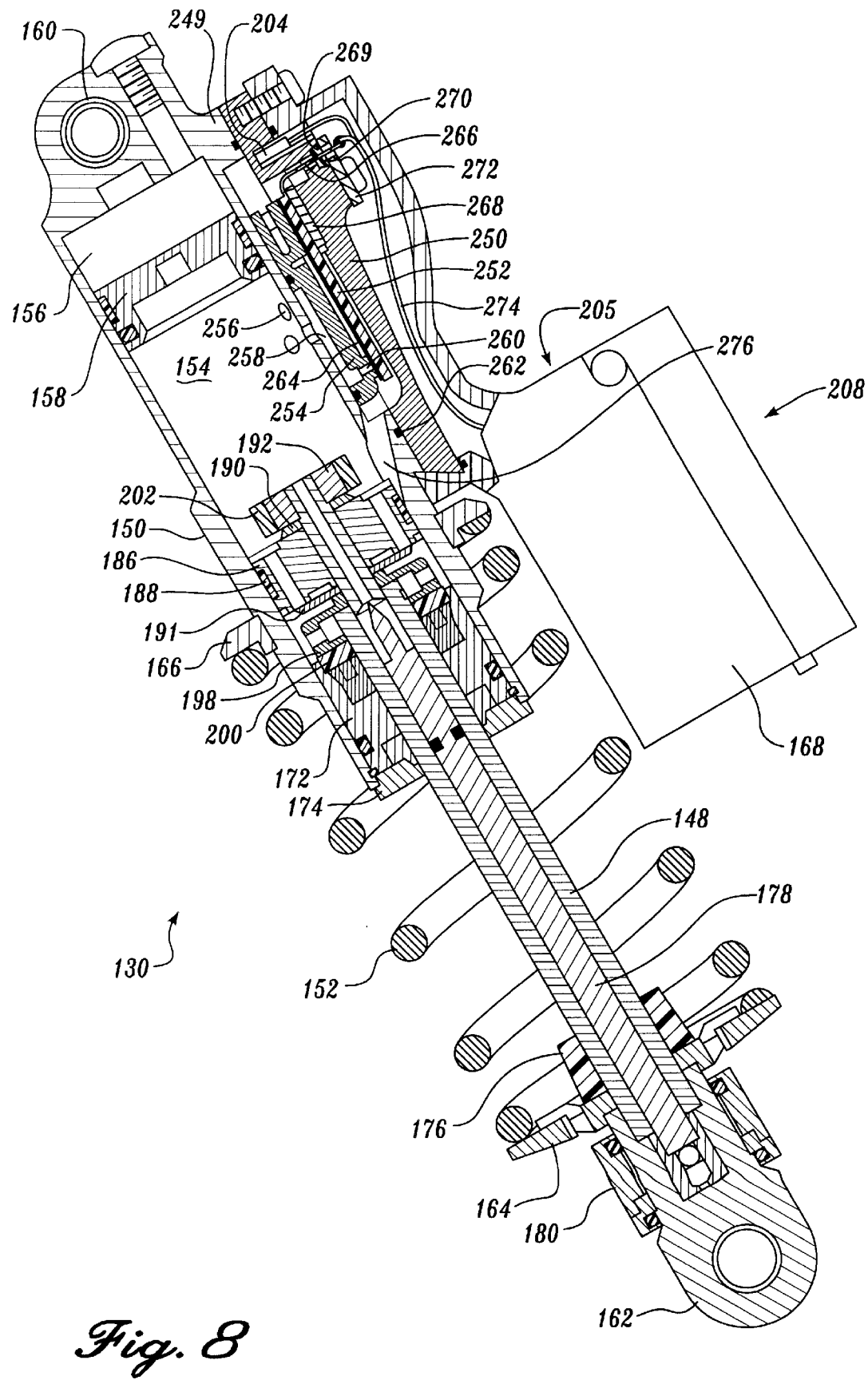
FIG. 8 is a cross-sectional view of the alternate preferred shock absorber having a bypass valve.
Figure 9:
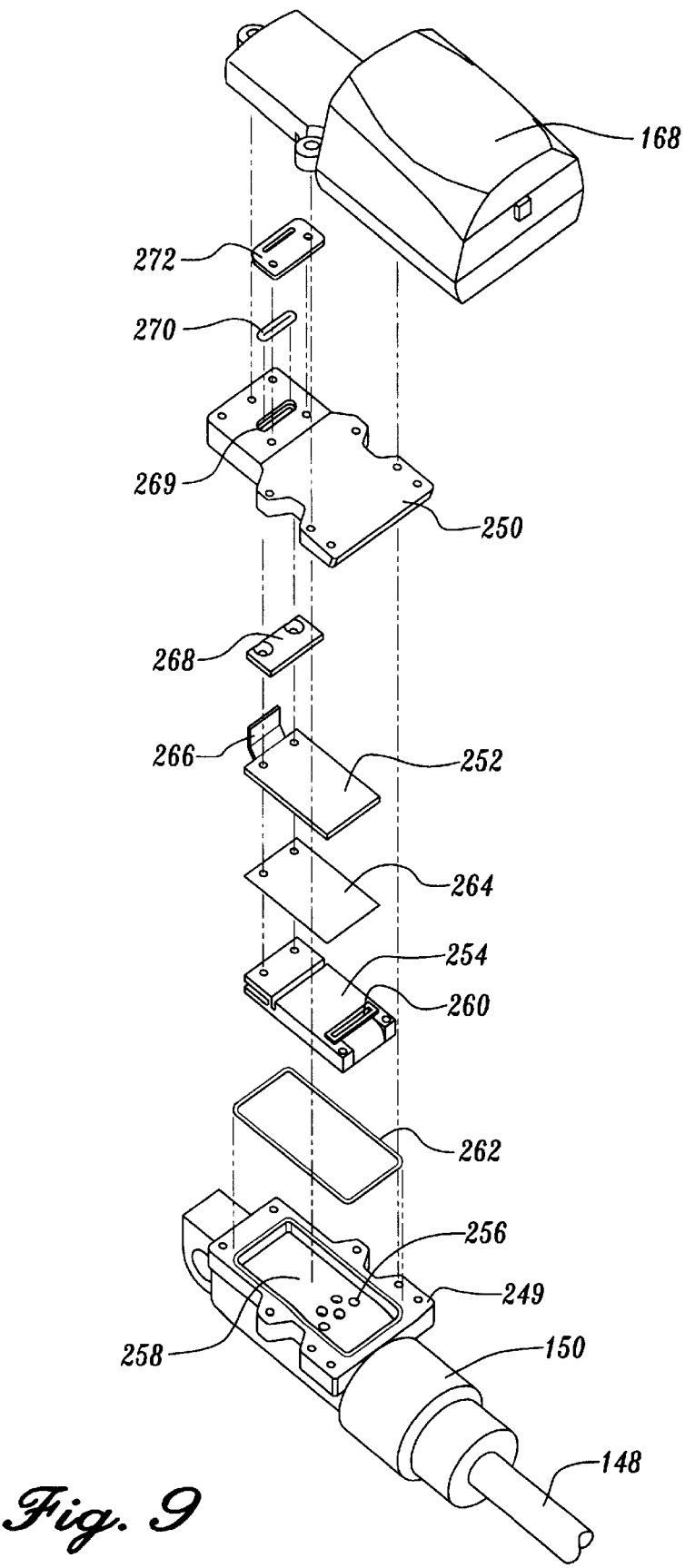
FIG. 9 is an exploded isometric view of the bypass housing and valve of the shock absorber illustrated in FIG. 8.

The bypass valve assembly is best illustrated in FIGS. 8 and 9. Reservoir housing 150 is specially constructed so as to include housing flange 249 to secure the elements of the bypass valve assembly. Reservoir housing 150 includes the standard housing to create hydraulic reservoir 154. Within the sides of reservoir housing 150 inflow openings 256 and outflow channel 276 extend therethrough into inflow chamber 284. Orifice plate 254 separates inflow chamber 258 from outflow channel 276. Orifice plate 254 covers inflow openings 256 and channels the fluid that enters inflow openings 256 to an orifice 260. Orifice plate 254 has a generally parallelepiped outer shape with a lower recess to form inflow chamber 258 between orifice plate 254 and reservoir housing 150. Orifice 260 is a slot with upwardly projecting lips within one end of orifice plate 254. The lips extend upwardly from the upper surface of orifice plate 254.

Bender 252 is seated on top of orifice plate 254. The lower surface of bender 252 is protected with a valve shim 264. Bender 252 is generally rectangular in shape and includes a layered construction such as that described above for use with the piezo disk embodiment. Bender 252 includes a bender cable 266 that extends upwardly from the rearward end of bender 252 to provide electrical interconnections in order to apply voltages across the various layers of bender 252. Valve shim 264 is preferably constructed of a brass material and is secured to the rearward ends of both orifice plate 254 and bender 252. Valve shim 264 is generally coextensive with the bottom surface of bender 252 to protect the bottom surface thereof. Valve shim 264 is thus sandwiched between bender 252 and orifice plate 254 and rests immediately on top of the lips of orifice 260 to restrict the flow thereof with bender 252. Bender 252 may alternatively be comprised of another response material that may be variably biased based on magnetic or electrical or other forces. Alternatively, bender 252 may simply be a passive bender, such as spring steel, to simply have a constant spring rate or variable spring rate depending on the stacking of shims, for example, to affect the flow through orifice 260. A bender clamp 268 with screws secures the bender, valve shim and orifice plate assembly to the top of reservoir housing 150.

A substantially rectangular bypass cover 250 with a recess in the lower side thereof is secured to housing flange 249 to secure the entire valve assembly in place. Bypass cover 250 includes cable opening 269 to allow bender cable 266 to project therethrough for interconnection with a wire ribbon 274 leading to the electronics circuit board within electronics housing 168 as described above. The cable O-ring 270 and cable seal clamp 272 secure to the top of cable opening 269 to seal bender cable 266 such that no fluid escapes bypass cover 250. Electronics housing 168 covers the top of bypass cover 250 and includes the circuit board, battery, and wire ribbon to control the biasing of bender 252 to actively control the flow through the bypass valve assembly; the electronics may activate the bender, as described above with regard to the disk-shaped bender. Thus, the biasing force supplied by bender 252 onto orifice 260 may be varied based on input received from sensor 204 and transmitted to the circuit board.

Figure 10A:
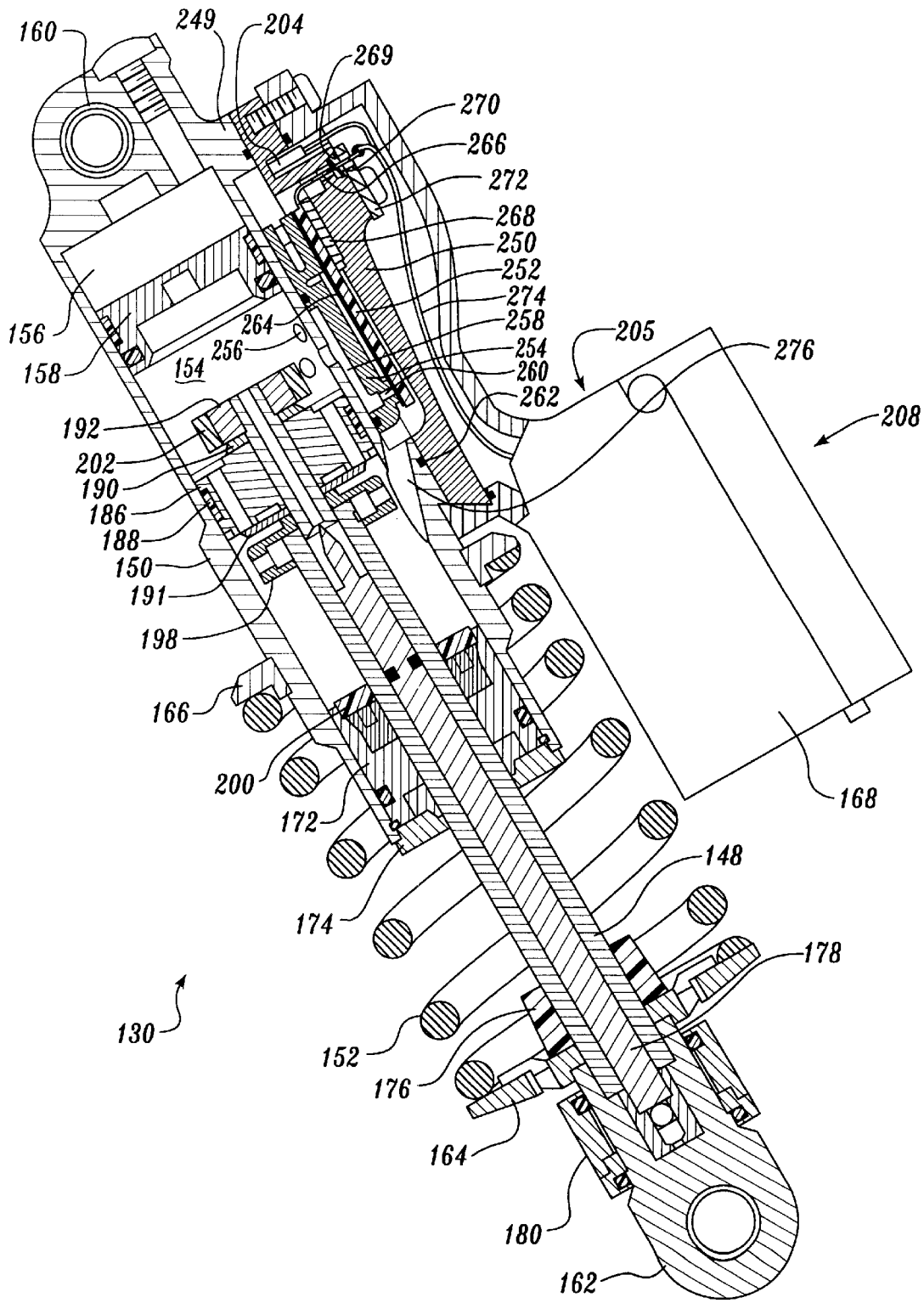
FIG. 10A is a cross-sectional view of the bypass shock absorber with the piston in a partially compression position.
Figure 10B:
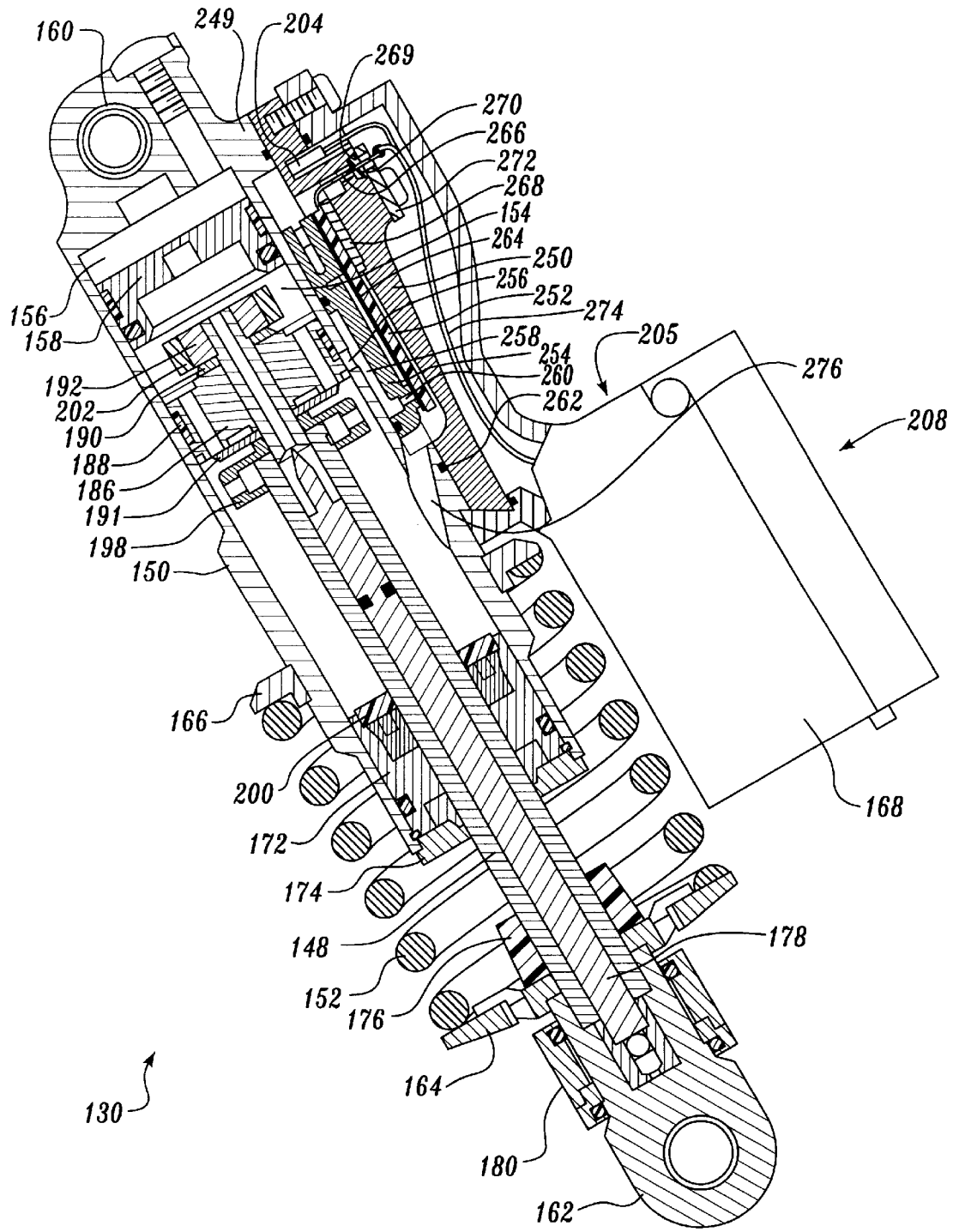
FIG. 10B is a cross-sectional view of the bypass shock absorber in a nearly fully compressed position.

Referring now to FIGS. 8, 10A and 10B, the basic functioning of the bypass valve assembly will now be described. Shock absorber 130 illustrated in FIG. 8 is in an initial position before being compressed either by rider weight or by forces acting on shock absorber 130, such as bumps or other shocks to the bicycle or other apparatus to which shock absorber 130 is secured. The following description will refer to shock absorber 130 for use in its preferred application on a mountain bike. However, it should be understood that shock absorber 130 could be used for other articles, including other vehicles, machines, or other devices.

In the initial position illustrated in FIG. 8, note that piston 186 is below both inflow openings 256 and outflow channel 276 such that compression of piston 186 within hydraulic reservoir 154 will not yield any bypass flow. Thus, the initial stroke of piston 186 is somewhat stiff due to not having this extra damping action. This is desirable at the beginning of the stroke to decrease rider- or pedal-induced suspension action on a mountain bike. This also is the general region in which the preload from the weight of the rider will act on shock absorber 130. Thus, it is desirable that shock absorber 130 not compress excessively under the preload of the rider, but retain most of its suspension action for actual shocks encountered while riding. Alternate embodiments of the invention, wherein initial soft damping is required, may include outflow channel 276 extending below piston 186 when in the no-stroke position illustrated in FIG. 8. Note in this position that as force is applied to compress piston 186 within reservoir 154 that the pressures will be balanced and no substantial flow through the bypass valve assembly will occur. The only flow from one side of piston 186 to the other must occur through piston 186 itself. If no flow channels are provided in piston 186, movement could still be allowed due to the compression of the gas within gas chamber 156. This would be the case if particularly stiff damping is desired during the initial portion of the stroke of shock absorber 130.

FIG. 10A illustrates an intermediate stroke position of piston 186 within reservoir 154. In this position, piston 186 is beyond outflow channel 276 such that flow through the bypass valve assembly is allowed; as piston 186 pushes further within reservoir 154, fluid is forced through inflow openings 256 into inflow chamber 258. From inflow chamber 258, fluid proceeds to orifice 260 and is forced against the lower side of valve shim 264 held in place by bender 252. Note that bender 252 is biased against orifice 260 as controlled by the logic circuit of the circuit board housed within electronics housing 168 as described above. Alternatively, the variable biasing of bender 252 may be turned off such that the natural spring resilience of bender 252 simply operates in a constant bias against orifice 260 to control the flow. In another alternate embodiment of the electronics, bender 252 may be biased to a set condition by applying a constant voltage to the piezoelectric material sandwiched within bender 252. In any event, as the pressure of the fluid bears sufficiently against bender 252, the fluid passes between the orifice 260 and bender valve shim 264 to enter outflow channel 276 and fill in behind piston 186. Note that this region of piston 186 compression may be the lowest damping force in this preferred embodiment since flow is allowed through all of inflow openings 256 (preferably five) and out of outflow channel 276 to the back side of piston 186.

In the position of piston 186 illustrated in FIG. 10B, the flow through the bypass valve assembly is again somewhat restricted. This is due to the sides of piston 186 initially blocking the first holes of inflow opening 256 and then blocking all of inflow openings 256 such that no flow extends through the bypass valve assembly. Thus, shock absorber 130 becomes much stiffer. This can be very advantageous to avoid bottoming out shock absorber 130 during a heavy shock event. By having inflow openings 256 sequentially covered, the damping force increases the closer piston and shock absorber 130 come to bottoming out. Thus, three inflow openings 256 are first covered and then two additional openings are covered before flow is entirely stopped through the bypass valve assembly.

Thus, even without electronic or other control of bender 252, significant advantageous properties of damping are achieved with the bypass valve arrangement illustrated and described above. The damping is higher at the initial portion of the stroke to deal with rider preload, as well as pedal- or rider-induced bobbing, and eliminate these negative effects on the shock absorber. As actual bumps are encountered, the damping goes to a moderate to low level to allow the shock absorber 130 to absorb the shock effectively. When large bumps are encountered, the damping progressively increases as the stroke increases to cover inflow openings 256. By further including an active piezo bender 252 combined with a sensor 204, the velocity of piston 186 can also be taken into account in addition to the displacement to change the damping force to an optimum level for the smoothest ride possible with the best connection of the wheels to the ground. The arrangement is also advantageous should the electronics or wiring fail in the piezoelectric embodiment; the shock absorber would still work better than standard shock absorbers if a given spring constant is inherent in bender 252 to provide damping by having a constant biasing force against orifice 260.

Figure 11B:
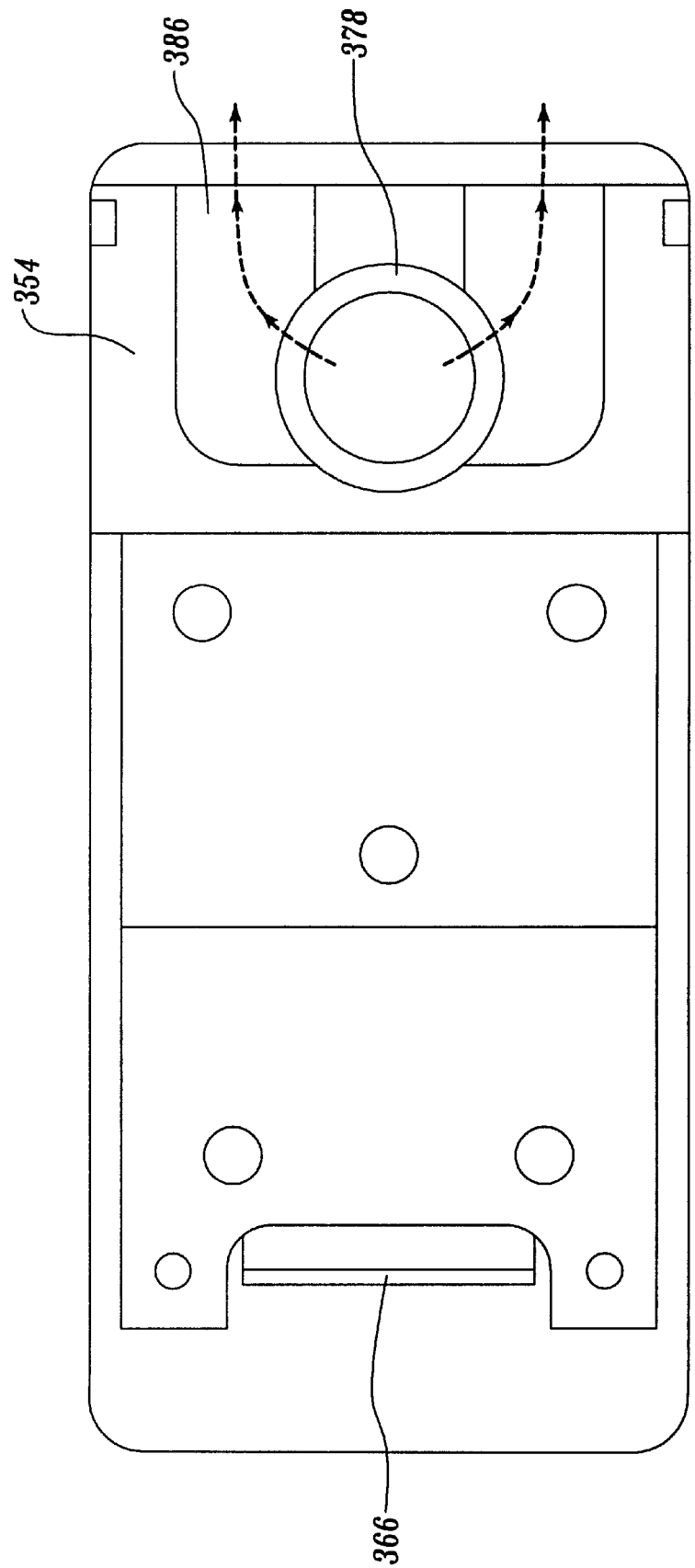
FIG. 11B is a plan view of a portion of the bypass valve arrangement of FIG. 11A.

An alternate embodiment of the bypass valve assembly will now be described in connection with FIGS. A and B. In this embodiment, a valve body 378 is provided and moved by piezo bender 352. The valve body itself is balanced with respect to the fluid forces flowing through the bypass valve assembly such that piezo bender 352 does not have to bear as much against the full pressure of the flow of the fluid through the bypass valve assembly. During compression of the piston, flow enters inflow openings 356 and pushes upwardly on a flapper valve 388. Flapper valve 388 is preferably a thin sheet of stainless steel that may be easily bent upwardly by the pressure of the fluid flowing through inflow openings 356. Flapper valve 388 obstructs flow going in the opposite direction such that flow will not exit inflow openings 356. Fluid then enters inflow chamber 358 which is beneath and surrounds bender 352. Bender 352 is secured to chamber plate 354 with a bender clamp 368 secured to the bottom thereof. Thus, bender 352 is secured to the underside of chamber plate 354. The sides of chamber plate 354 are narrower than inflow chamber 358 such that flow is allowed to move above the chamber plate 354 into upper channel 380 that extends to valve body 378. Valve body 378 is generally cylindrical in shape and moves in a direction transverse to the longitudinal axis of the shock absorber and transverse to the longitudinal axis of bender 352. Thus, bender 352 moves up and down about valve body 378 without valve body 378 moving in a direction opposite the flow of fluid through the bypass valve assembly. Valve body 378 includes a valve recess at a lower portion thereof on the side of valve body 378 abutting bender 352. The end of bender 352 extends within valve recess 384. A bender clip 369 is secured to the end of rectangular-shaped bender 352 to engage within valve recess 384. Bender clip 369 is preferably C-shaped in cross-section and its inner portion is secured to the distal end of bender 352. The outer corner of bender clip 369 bears against the sides of valve recess 384 such that when piezo bender 352 is biased upwardly or downwardly due to an applied voltage across the layers thereof (as discussed above), bender clip 369 will push valve body 378 upwardly or downwardly to restrict or allow flow over the top of valve body 378. Valve body 378 includes a hollow core 382 such that valve body 378 is balanced. In other words, the pressure of the hydraulic fluid will not have as much effect on the position of valve body 378 since fluid is allowed to flow entirely through valve body 378. In order for flow to exit the bypass valve, and valve body 378 in particular, it must pass over the rim of valve body 378 into side channels 386. FIG. 11B, illustrates flow over the top of valve body 378 into side channels 386 such that the flow can exit through outflow channel 376. The upper rim of valve body 378 is angled to further decrease the effect of the flow on biasing valve body 378 downwardly. Thus, with a substantially balanced valve body 378, the power requirements to move bender 352 are much lower. The embodiment described and illustrated in FIGS. 11A and 11B otherwise functions much the same as the preferred bypass valve arrangement described above with inflow openings 356 and outflow channel 376 positioned accordingly.

A second alternate embodiment with a balance valve body will now be described in connection with FIGS. 12A–12C. In this embodiment, a valve body 478 is provided that is also balanced somewhat to avoid the effect of the direct force of the fluid flowing through the bypass valve arrangement pushing the valve body 478 away from flow restriction and thus requiring less power. The embodiment illustrated in FIGS. 12A–12C may require even less power than other embodiments due to its arrangement of secondary flow moving valve body 478 with a diaphragm 504. A bender 452 is provided clamped within a chamber plate 454 in a manner similar to that described above in connection with FIGS. 11A and B. However, bender 452 does not extend to a direct connection with valve body 478. Bender 452 secures to chamber plate 454 with bender clamp 468, but extends toward valve body 478 only enough to cover a secondary flow orifice 460. Secondary flow orifice 460 provides a small opening adjacent cylindrical valve body 478, which allows a moderate flow of fluid to extend upwardly and be channeled into a secondary flow channel 490. Secondary flow channel 490 channels the secondary flow to the side of chamber plate 454 and then upwardly such that it may enter into a diaphragm chamber 492 disposed above cylindrical diaphragm 504. Diaphragm 504 is cylindrical in shape and is sealed to chamber plate 454 with seals 506 directly above valve body 478. Valve body 478 is cylindrical in shape and has a hollow core 482. Valve body 478 also includes a valve stem 494 projecting upwardly from the center thereof to engage the center of diaphragm 504. Diaphragm 504 is constructed of a thin elastically flexing material. Thus, when diaphragm 504 moves upwardly or downwardly, it moves valve body 478 upwardly or downwardly accordingly. A balance chamber 480 is provided below diaphragm 504 to allow for movement of diaphragm 504 and to balance the fluid forces on valve body 478 such that it can move transverse to the general primary flow of fluid through the bypass valve assembly. The primary flow proceeds through inflow openings 456 beneath flapper valve 488 and then into side channels 486. Side channels 486 are illustrated in FIG. 12C and extend from the side of a lower plate 500 beneath valve body 478 to the sides of valve body 478. The exit of flow is allowed through the side of valve body 478, which includes a flow recess 498 to allow the flow to exit into outflow channel 476. Note that a balance orifice 496 extends through the top of valve body 478 to allow fluid to enter balance chamber 480 such that the pressure of the primary flow does not press valve body 478 upwardly and thus provides no valve action. The secondary flow that extends through or past bender 452, through secondary flow orifice 460, and secondary flow channel 490 and into diaphragm chamber 492, is allowed to exit diaphragm chamber 492 through a bleed channel 502. Bleed channel 502 is situated to the side of diaphragm 504 within chamber plate 454. Bleed channel 502 allows the flow to exit into outflow channel 476. The bypass valve assembly operates by controlling the amount of fluid allowed into and over diaphragm chamber 492, thus affecting the flex of diaphragm 502. Diaphragm 502 adjusts the position of valve body 478 upwardly or downwardly to cut-off the primary flow of fluid past valve body 478. The primary flow is cut-off when valve body 478 is pushed downwardly, thus restricting the flow through side channels 486. This embodiment is advantageous because less power is needed to move bender 452 since only a secondary flow must be controlled by bender 452.

FIG. 12B illustrates the flow of the secondary fluid. FIG. 12B illustrates the arrangement with bypass cover 450 removed. FIG. 12C is an illustration with a cross-section in a position as shown in FIG. 12A.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A dampener for a shock absorber comprising:
   (a) a fluid reservoir containing fluid;
   (b) a piston disposed at least partially within said reservoir, said piston being forced at least partially through said reservoir under the force of a shock acting on the shock absorber;
   (c) a channel in fluid communication with said reservoir through which fluid flows during at least a portion of the stroke of said piston through said reservoir;
   (d) a valve at least partially obstructing said channel, said valve including means for changing the flow through said channel based on at least one of the velocity and position of said piston relative to said reservoir, said means including a bender moving to affect the flow of fluid through said channel, said bender having a response material embedded within at least a portion thereof, wherein said valve includes a flow restriction member and a diaphragm attached to said flow restriction member, said bender being movable to direct a secondary flow of fluid to a side of said diaphragm to move said diaphragm, said diaphragm moving said restriction member, a primary flow of fluid passing through said channel as controlled by said flow restriction member.

2. The dampener of claim 1, wherein said response material comprises a piezoelectric material, said valve further including a power supply connected to the piezoelectric material for biasing the bender to affect the flow through said channel.

3. The dampener of claim 2, wherein said sensor includes a means for changing the biasing force of said bender for flow change when said sensor signals predetermined conditions.

4. The dampener of claim 1, wherein said valve includes a flow restriction member movable generally transverse to the direction of fluid flow through a portion of said channel adjacent said restriction member.

5. The dampener of claim 4, wherein said flow restriction member is connected to said bender, movement of said bender controlling said flow restriction member.

6. The dampener of claim 1, wherein said reservoir is contained by a housing, said channel extending through inflow and outflow openings within said housing.

7. The dampener of claim 6, wherein said means for changing the flow through said channel includes a bender, movement of said bender affecting the flow through said channel, said bender having a response material embedded within at least a portion thereof.

8. The dampener of claim 7, wherein said response material comprises a piezoelectric material, said valve further including a power supply connected to the piezoelectric material for biasing the bender to affect the flow through said channel.

9. The dampener of claim 6, wherein said inflow opening is located within said housing in a location to be at least partially blocked by said piston upon extensive movement of said piston within said reservoir.

10. The dampener of claim 9, wherein said outflow opening is located within said housing in a location to be at least partially blocked by said piston during the initial portion of the stroke of said piston.

11. A dampener for a shock absorber comprising:
   (a) a housing having a sidewall defining an interior and holding a fluid within the interior thereof;
   (b) a piston movably disposed at least partially within the interior of said housing, said piston having a first end and a second end;
   (c) at least one inflow channel extending into the sidewall of said housing from the interior thereof, extensive movement of said piston within said housing at least partially blocking said inflow channel; and
   (d) an outflow channel extending at least partially into said sidewall of the housing to bypass said piston through said sidewall and externally of said piston from the first end of the piston to the second end of the piston, in fluid communication with said inflow channel, said outflow channel extending to the interior of said housing, wherein during at least a portion of the stroke of said piston said outflow channel delivers fluid behind the second end of said piston.

12. The dampener of claim 11, wherein said outflow channel extends into the interior of said housing in a position such that during the initial portion of the stroke of said piston at least a portion of the outflow channel does not deliver fluid behind the second end of the piston.

13. The dampener of claim 12, further comprising a valve between said inflow and outflow channels.

14. The dampener of claim 13, wherein said valve includes means for changing the flow based on at least one of the velocity and position of said piston relative to said housing.

15. The dampener of claim 14, wherein said valve includes a bender, movement of said bender affecting the flow through said valve, said bender having a piezoelectric response material embedded within at least a portion thereof, said valve further including a power supply connected to the piezoelectric material for biasing the bender to affect the flow through said channel.

16. The dampener of claim 11, further comprising a valve between said inflow and outflow channels, wherein said valve includes means for changing the flow based on at least one of the velocity and position of said piston relative to said housing.

17. A dampener for a shock absorber comprising:
   (a) a housing having a sidewall defining an interior and holding a fluid within the interior thereof;
   (b) a piston movably disposed at least partially within the interior of said housing, said piston having a first end and a second end;
   (c) at least one inflow channel extending into the sidewall of said housing from the interior thereof; and
   (d) an outflow channel extending at least partially into said sidewall of the housing to bypass said piston through said sidewall externally of said piston from the first end of the piston to the second end of the piston, in fluid communication with said inflow channel, said outflow channel extending to the interior of said housing, wherein during at least a portion of the stroke of said piston said outflow channel delivers fluid behind the second end of said piston, wherein said outflow channel extends into the interior of said housing in a position such that during the initial portion of the stroke of said piston at least a portion of the outflow channel does not deliver fluid behind the second end of the piston.

18. The dampener of claim 17, wherein extensive movement of said piston within said housing at least partially blocks said inflow channel.

19. The dampener of claim 17, further comprising a valve between said inflow and outflow channels, wherein said valve includes means for changing the flow based on at least one of the velocity and position of said piston relative to said housing.

20. A shock absorber comprising:
   (a) a fluid-filled reservoir including a sidewall defining an interior;
   (b) an elongate member having a first end extending partially into the interior of said reservoir;
   (c) a piston secured to the first end of said elongate member and held within the interior of said reservoir for being forced through said fluid-filled reservoir to dampen the shock absorber the piston having a first end or second end;
   (d) at least one fluid channel extending at least partially into said sidewall of the reservoir to bypass said piston through said sidewall and externally of said piston from the first end of the piston to the second end of the piston, in fluid communication with said reservoir through which fluid is forced when said piston is forced through said reservoir, said fluid channel extending into the side of said fluid filled reservoir and having an inflow opening and an outflow opening into said reservoir; and
   (e) a valve at least partially blocking the flow of fluid through said fluid channel, said valve having a response material embedded within at least a portion thereof to change the flow through said valve.

21. The shock absorber of claim 20, wherein said valve includes a sensor indicating at least one of the position and velocity of said piston relative to said reservoir and a controller receiving said sensor indication to change a biasing force of said valve to control flow through said valve based on at least one of the position and velocity of said piston relative to said reservoir.

22. The shock absorber of claim 21, wherein extensive movement of said piston within said reservoir at least partially blocks said inflow opening.

23. The shock absorber of claim 21, wherein said valve includes a bender, movement of said bender affecting the flow through said valve, said bender having a piezoelectric response material embedded within at least a portion thereof, said valve further including a power supply connected to the piezoelectric material for biasing the bender to affect the flow through said channel.

24. The shock absorber of claim 20, wherein said valve includes a bender, movement of said bender affecting the flow through said valve, said bender having a piezoelectric response material embedded within at least a portion thereof, said valve further including a power supply connected to the piezoelectric material for biasing the bender to affect the flow through said channel.

25. A shock absorber comprising:
   (a) a fluid-filled reservoir;
   (b) an elongate member having a first end extending partially into said reservoir;

(c) a piston secured to the first end of said elongate member and held within said reservoir for being forced through said fluid-filled reservoir to dampen the shock absorber;

(d) at least one fluid channel defined at least partially within a wall of the reservoir to bypass said piston externally of said piston, in fluid communication with said reservoir through which fluid is forced when said piston is forced through said reservoir, said fluid channel extending into the side of said fluid filled reservoir and having an inflow opening and an outflow opening into said reservoir, wherein extensive movement of said piston within said reservoir at least partially blocks said inflow opening and wherein said outflow opening is located within said reservoir in a location to be at least partially blocked by said piston during the initial portion of the stroke of said piston; and (e) a valve at least partially blocking the flow of fluid through said fluid channel, said valve having a response material embedded within at least a portion thereof to change the flow through said valve.

* * * * *